(12) United States Patent
Kesho et al.

(10) Patent No.: US 9,052,555 B2
(45) Date of Patent: Jun. 9, 2015

(54) LIQUID CRYSTAL DISPLAY DEVICE

(71) Applicants: Masato Kesho, Ishikawa-ken (JP);
Hirokazu Morimoto, Saitama-ken (JP);
Kazuhiro Takahashi, Ishikawa-ken (JP);
Jin Hirosawa, Saitama-ken (JP)

(72) Inventors: Masato Kesho, Ishikawa-ken (JP);
Hirokazu Morimoto, Saitama-ken (JP);
Kazuhiro Takahashi, Ishikawa-ken (JP);
Jin Hirosawa, Saitama-ken (JP)

(73) Assignee: JAPAN DISPLAY INC., Tokyo (JP)

( * ) Notice: Subject to any disclaimer, the term of this patent is extended or adjusted under 35 U.S.C. 154(b) by 199 days.

(21) Appl. No.: 13/727,004

(22) Filed: Dec. 26, 2012

(65) Prior Publication Data

US 2013/0169918 A1    Jul. 4, 2013

(30) Foreign Application Priority Data

Dec. 28, 2011 (JP) ................ 2011-287820
Jan. 11, 2012 (JP) ................ 2012-003355

(51) Int. Cl.
*G02F 1/1343* (2006.01)

(52) U.S. Cl.
CPC .... *G02F 1/134363* (2013.01); *G02F 1/134336* (2013.01); *G02F 2001/134318* (2013.01)

(58) Field of Classification Search
CPC .............. G02F 1/134363; G02F 2001/134318
USPC ................................. 349/139, 141
See application file for complete search history.

(56) References Cited

U.S. PATENT DOCUMENTS

| 6,266,116 | B1 | 7/2001 | Ohta et al. | |
|---|---|---|---|---|
| 6,657,693 | B1 | 12/2003 | Jeong et al. | |
| 2001/0010575 | A1* | 8/2001 | Yoshida et al. | 349/141 |
| 2004/0165136 | A1 | 8/2004 | Sugiyama et al. | |
| 2005/0206824 | A1* | 9/2005 | Son et al. | 349/141 |
| 2005/0219453 | A1 | 10/2005 | Kubo et al. | |

(Continued)

FOREIGN PATENT DOCUMENTS

| JP | 6-222397 | 8/1994 |
|---|---|---|
| JP | 7-159807 | 6/1995 |

(Continued)

OTHER PUBLICATIONS

Office Action issued Jan. 27, 2015, in Japanese Patent Application No. 2011-287820, filed Dec. 28, 2011,(with English-language Translation).

(Continued)

*Primary Examiner* — Richard Kim
*Assistant Examiner* — Ryan Crockett
(74) *Attorney, Agent, or Firm* — Oblon, McClelland, Maier & Neustadt, L.L.P.

(57) ABSTRACT

In one embodiment, a first substrate is provided with a pixel electrode including a contact portion, a pair of main pixel electrodes extending in a first direction from the contact portion, a sub-pixel electrode arranged between the contact portion and an end of the extending main pixel electrodes and extending in a second direction so as to connect the pair of main pixel electrodes. A second substrate is provided with a common electrode including first and second main common electrodes sandwiching the pair of the main pixel electrodes, a third main common electrode arranged substantially in the center between the pair of main pixel electrodes and extending in parallel with the first and second main common electrodes, and a sub-common electrode arranged between the contact portion and the sub-pixel electrode and connected with the first, second and third main common electrodes extending in the second direction.

16 Claims, 11 Drawing Sheets

(56) References Cited

U.S. PATENT DOCUMENTS

| | | | |
|---|---|---|---|
| 2007/0115234 A1 | 5/2007 | Kim et al. | |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2008/0273154 A1* | 11/2008 | Song et al. | 349/139 |
| 2009/0207363 A1* | 8/2009 | Hirosawa | 349/139 |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-3802 A * | 6/2005 |
| JP | 2005-242307 | 9/2005 |
| JP | 2007-47786 | 2/2007 |
| JP | 2011-209454 | 10/2011 |

OTHER PUBLICATIONS

Office Action mailed Feb. 27, 2015 in Chinese Patent Application No. 201210586893.3 (English translation only).

* cited by examiner

LIQUID CRYSTAL DISPLAY DEVICE

CROSS-REFERENCE TO RELATED APPLICATION

This application is based upon and claims the benefit of priority from prior Japanese Patent Applications No. 2011-287820 filed Dec. 28, 2011 and No. 2012-003355 filed Jan. 11, 2012, the entire contents of which are incorporated herein by reference.

FIELD

Embodiments described herein relate generally to a liquid crystal display device.

BACKGROUND

In recent years, a flat panel display is developed briskly. Especially, the liquid crystal display device gets a lot of attention from advantages, such as light weight, thin shape, and low power consumption. In an active matrix type liquid crystal display device equipped with a switching element in each pixel, structures using lateral electric field, such as IPS (In-Plane Switching) mode and FFS (Fringe Field Switching) mode, attract attention. The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
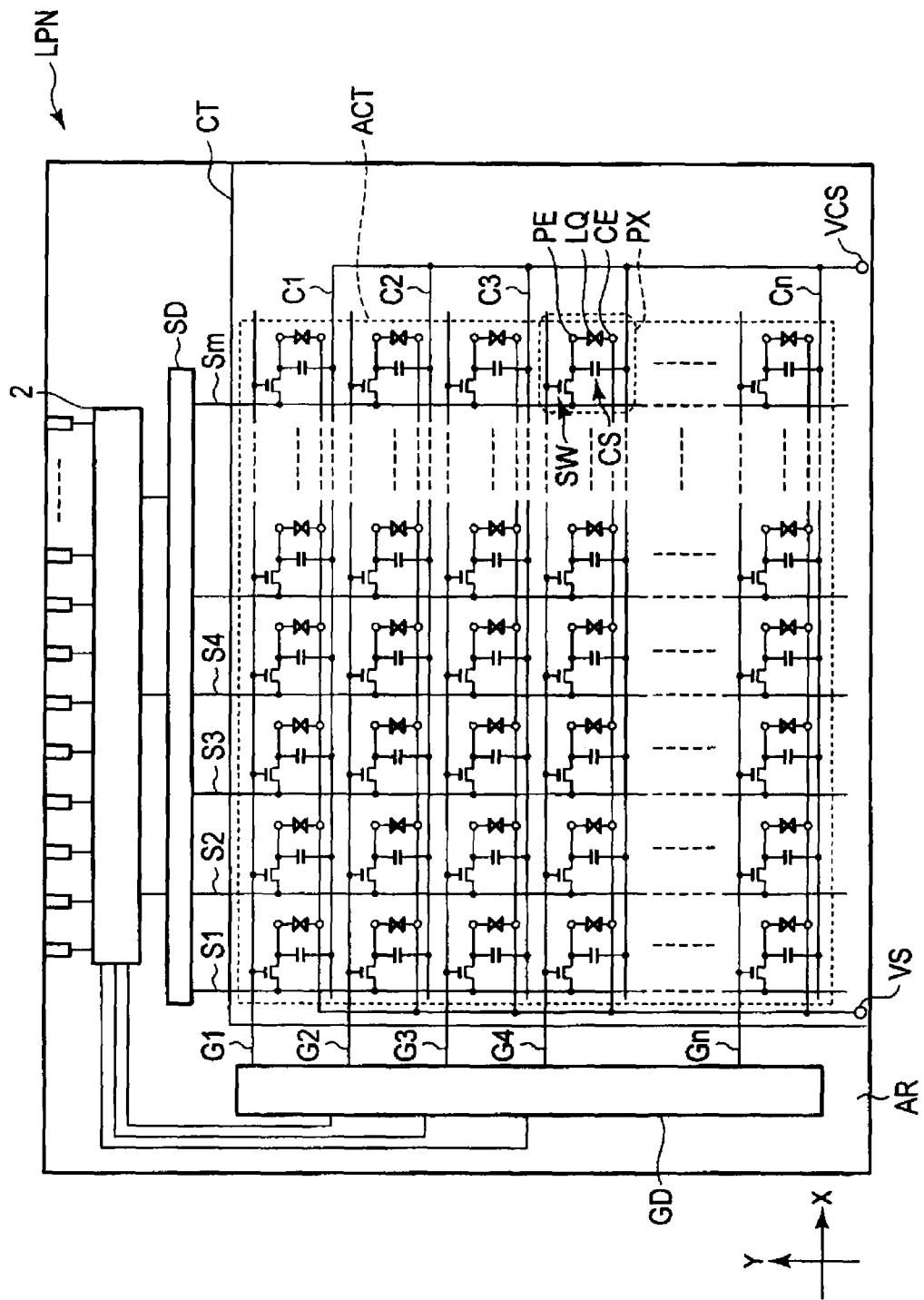
FIG. 1 is a figure schematically showing a structure and the equivalent circuit of a liquid crystal display device according to one embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate provided with a pixel electrode including a contact portion, a pair of main pixel electrodes extending in a first direction from the contact portion, and a sub-pixel electrode arranged between the contact portion and an end of the extending main pixel electrode, the sub-pixel electrode extending in a second direction orthogonally crossing the first direction so as to connect the pair of main pixel electrodes; a second substrate provided with a common electrode including first and second main common electrodes sandwiching the pair of main pixel electrodes, a third main common electrode arranged substantially in the center between the pair of main pixel electrodes and extending in parallel with the first and second main common electrodes, and a first sub-common electrode arranged between the contact portion and the sub-pixel electrode, the first sub-common electrode connected with the first, second and third main common electrodes and extending in the second direction; and a liquid crystal layer held between the first substrate and the second substrate and having liquid crystal molecules.

According to other embodiment, a liquid crystal display device includes: a first substrate including; a pair of source lines extending in a first direction, first and second gate lines extending in a second direction orthogonally crossing the first direction, and a pixel electrode including a contact portion arranged close to the first gate line, and first and second main pixel electrodes extending to the second gate line in the first direction from the contact portion, wherein the contact portion is formed in a rectangular shape having two ends facing the source lines, respectively, and the first and second main pixel electrodes extend to the second gate line from locations of the contact portion apart from the ends facing the source lines to a central portion thereof, respectively, a second substrate including a main common electrode having first and second main common electrodes sandwiching the first and second main pixel electrodes and facing the source lines, respectively, and a third main common electrode arranged in the center between the first and second main pixel electrodes extending substantially in parallel with the first and second main pixel electrodes; and a liquid crystal layer held between the first substrate and the second substrate and having liquid crystal molecules.

FIG. 1 is a figure schematically showing a structure and the equivalent circuit of the liquid crystal display device according to one embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer held between the array substrate AR and the counter substrate CT. The liquid crystal display panel LPN includes an active area ACT which displays images. The active area ACT is constituted by a plurality of pixels PX arranged in the shape of a (m×n) matrix (here, "m" and "n" are positive integers).

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C extend in a first direction X, respectively. The gate line G and the auxiliary capacitance line C are arranged in turns along a second direction Y that orthogonally intersects the first direction X. The source lines S cross the gate line G and the capacitance line C. The source lines S extend linearly in the second direction Y, respectively. The gate line G, the auxiliary capacitance line C and the source lines S do not necessarily extend linearly, and a portion thereof may be crooked partially.

Each gate line G is pulled out to outside of the active area ACT, and is connected to a gate driver GD. Each source line S is pulled out to the outside of the active area ACT, and is connected to a source driver SD. At least a portion of the gate driver GD and the source driver SD is formed in the array substrate AR, for example, and the gate driver GD and the source driver SD are connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE. The auxiliary capacitance line C is electrically connected with a voltage impressing portion VCS to which an auxiliary capacitance voltage is impressed.

In addition, in the liquid crystal display panel LPN according to this embodiment, while the pixel electrode PE is formed in the array substrate AR, at least one portion of the common electrode CE is formed in the counter substrate CT. Liquid crystal molecules of the liquid crystal layer LQ are switched mainly using an electric field formed between the pixel electrode PE and the common electrode CE. The electric field formed between the pixel electrode PE and the common electrode CE is a lateral electric field substantially in parallel with the principal surface of the array substrate AR or the principal surface of the counter substrate CT, or an oblique electric field slightly oblique with respect to the principle surfaces of the substrates.

The switching element SW is constituted by an n channel type thin film transistor (TFT), for example. The switching element SW is electrically connected with the gate line G and the source line S. The (m×n) switching elements SW are formed in the active area ACT. The switching element SW may be either a top-gate type or a bottom-gate type. Though the semiconductor layer is formed of poly-silicon, the semiconductor layer may be formed of amorphous silicon.

The pixel electrode PE is arranged in each pixel and electrically connected with the switching element SW. The common electrode CE is arranged in common to the plurality of pixel electrodes PE through the liquid crystal layer LQ. Though the pixel electrode PE and the common electrode CE are formed by light transmissive conductive materials, such as Indium Tin Oxide (ITO), Indium Zinc Oxide (IZO), etc., other metals such as aluminum may be used.

The array substrate AR includes an electric power supply portion VS formed outside of the active area ACT for impressing a voltage to the common electrode CE. Furthermore, the common electrode CE is drawn to outside of the active area ACT and electrically connected with an electric power supply portion VS formed in the array substrate AR through an electric conductive component which is not illustrated.

Figure 2:
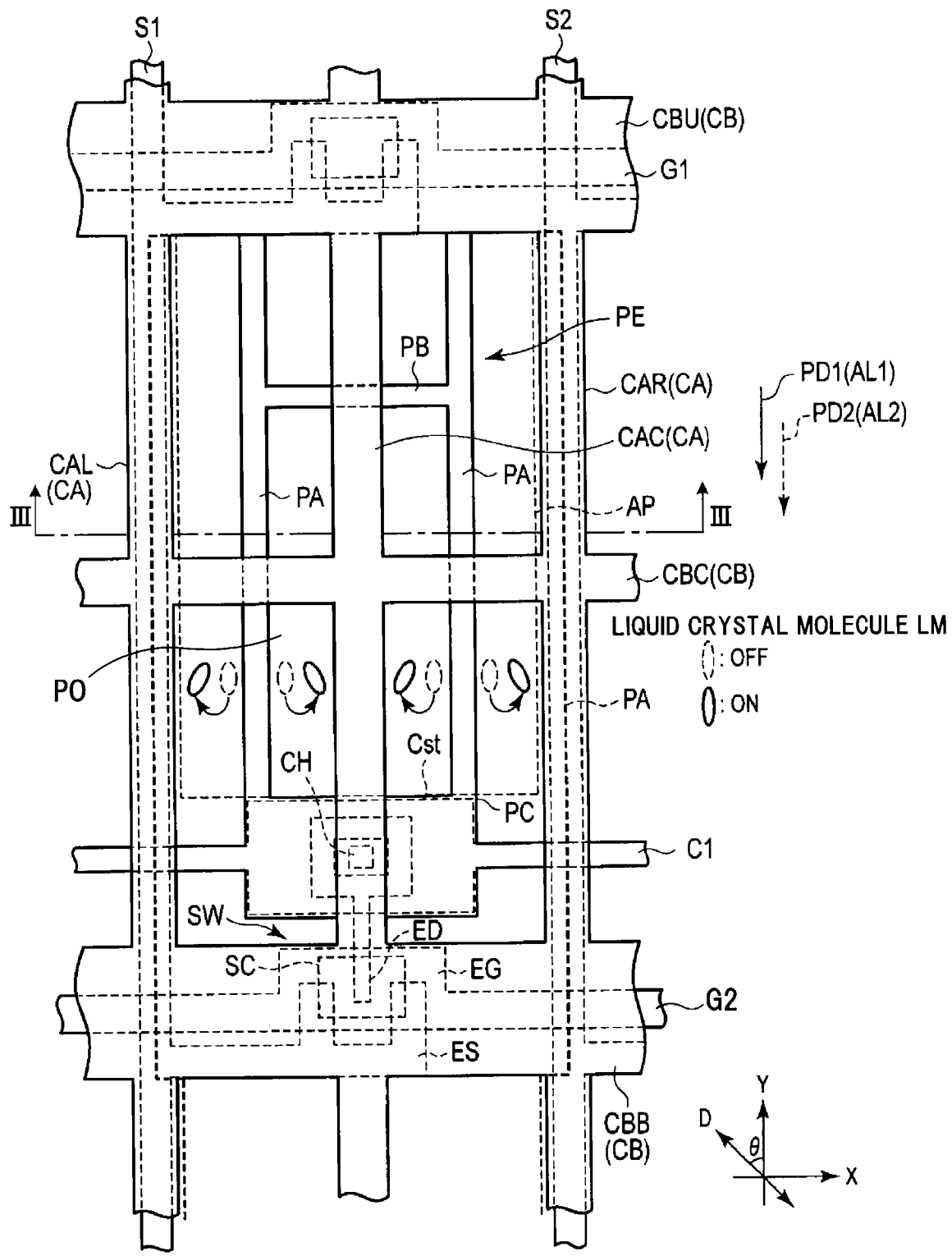
FIG. 2 is a plan view schematically showing a structure of one pixel when a display panel shown in FIG. 1 is seen from a counter substrate side according to a first embodiment.

FIG. 2 is a plan view schematically showing the structure of one pixel when the liquid crystal display panel according to a first embodiment is seen from the counter substrate side. Herein, a plan view in a X-Y plane specified in the first direction X and the second direction Y is shown.

The pixel PX has the shape of a rectangle whose length in the first direction X is shorter than the length in the second direction Y. In addition, according to this embodiment, the width of the pixel PX in the first direction X is approximately 50 μm, and the width of the pixel PX in the second direction Y is approximately 150 μm.

The gate line G1 and the gate line G2 extend along the first direction X. The auxiliary capacitance line C1 is arranged between the adjoining gate line G1 and gate line G2, and extends along the first direction X. The source line S1 and the source line S2 extend along the second direction Y. The pixel electrode PE is arranged between the adjoining source line S1 and source line S2. Moreover, the pixel electrode PE is located between the gate line G1 and the gate line G2.

In the illustrated example, the source line S1 is arranged at the left-hand side end in the pixel PX. Precisely, the source line S1 is arranged striding over a boundary between the illustrated pixel and a pixel PX adjoining the illustrated pixel PX on the left-hand side. The source line S2 is arranged at the right-hand side end. Precisely, the source line S2 is arranged striding over a boundary between the illustrated pixel and a pixel PX adjoining the illustrated pixel PX on the right-hand side.

Moreover, in the pixel PX, the gate line G1 is arranged at an upper end portion. Precisely, the gate line G1 is arranged striding over a boundary between the illustrated pixel and a pixel which adjoins the illustrated pixel PX on its upper end side. The gate line G2 is arranged at a lower end portion. Precisely, the gate line G2 is arranged striding over a boundary between the illustrated pixel and a pixel which adjoins the illustrated pixel PX on its lower end side.

The auxiliary capacitance line C1 is arranged near a lower end portion (near the switching element SW connected to the pixel electrode PE) of the pixel PX. In the central portion in the first direction X of the pixel PX, the auxiliary capacitance line C1 is equipped with a capacitance portion CsT in which the width in the second direction Y is broadened.

The switching element SW is electrically connected with the gate line G2 and the source line S1 in the illustrated example. Namely, the switching element SW is formed near an intersection of the gate line G2 with the source line S1.

The gate electrode EG of the switching element SW is electrically connected with the gate line G2 or integrally formed, the source electrode ES is electrically connected with the source line S1 or integrally formed, and the drain electrode ED is electrically connected with the pixel electrode PE through a contact hole CH formed in a region which overlaps with the auxiliary capacitance line C1. The drain electrode ED of the switching element SW extends from the bottom end of the pixel PX to the upper side along the second direction Y, and extends to under the pixel electrode PE.

The pixel electrode PE is equipped with a main pixel electrode PA, a sub-pixel electrode PB, and a contact portion PC which are electrically connected mutually. The contact portion PC is arranged near the bottom end (near the switching element SW connected to the pixel electrode PE) of pixel PX. Two main pixel electrodes PA linearly extend along the second direction Y, respectively, from two positions of the contact portion PC to near the upper end portion of the pixel PX.

The main pixel electrode PA is formed in the shape of a belt having substantially the same width along the first direction X. The contact portion PC is electrically connected with the drain electrode DE of the switching element SW through the contact hole CH. The contact portion PC is formed more broadly than the main pixel electrode PA in the first direction X, and arranged countering with the capacitance portion CsT.

The sub-pixel electrode PB is arranged extending in the first direction X between the gate line G1 and the contact portion PC. The sub-pixel electrode PB extends in the first direction X, and connects between the main pixel electrodes PA.

That is, an aperture PO surrounded by the electrodes extending in the first direction X and the second directions Y is formed. In the example shown in FIG. 2, the aperture PO surrounded with the contact portion PC, the two main pixel electrodes PA, and the sub-pixel electrode PB is formed. The aperture PO is formed in an approximately rectangular shape.

The common electrode CE is equipped with main common electrodes CA and sub-common electrodes CB on the counter substrate CT. The main common electrodes CA extend linearly along the second direction Y in parallel with the main pixel electrodes PA on the both sides sandwiching the main pixel electrodes PA in the X-Y plane. That is, while the main common electrodes CA counter with the source lines S, the main common electrodes CA extend substantially in parallel with the main pixel electrodes PA. The main common electrodes CA are formed in the shape of a belt having the same width along the first direction X.

In the illustrated example, the main common electrodes CA are arranged in three lines in parallel along the first direction X. The main common electrodes CA are arranged in both sides and the center of the pixel, respectively. Hereinafter, in order to distinguish the three lines, the main common electrode CA of the left-hand side in the figure is called CAL, the main common electrode of the right-hand side is called CAR, and the main common electrode of in the center is called CAC. The main common electrode CAL counters with the source line S1, the main common electrode CAR counters with the source line S2, and the main common electrode CAC counters with the contact portion between the main pixel electrodes PA of the pixel electrode PE. In the active area ACT or outside of the active area, the main common electrode CAL, the main common electrode CAR and the main common electrode CAC are electrically connected each other.

In the pixel PX, the main common electrode CAL is arranged at the left-hand side end. Precisely, the main common electrode CAL is arranged striding over a boundary between the illustrated pixel and a pixel which adjoins the illustrated pixel PX on the left-hand side. The main common electrode CAR is arranged at the right-hand side end. Precisely, the main common electrode CAR is arranged striding over a boundary between the illustrated pixel and a pixel which adjoins the illustrated pixel PX on the right-hand side. The main common electrode CAC is arranged substantially in the center of the pixel PX in the first direction X.

A sub-common electrode CB linearly extends along the first direction X between the contact portion PC and the sub-pixel electrode PB of the pixel electrode PE arranged along with the second direction Y in the X-Y plane. The sub-common electrode CB extends orthogonally crossing the main pixel electrode PA. The sub-common electrode CB is formed in the shape of a belt having the same width along the second direction Y. The sub-common electrode CB is arranged in the central portion of the pixel PX.

Further, the sub-common electrodes CB are arranged in the upper and lower end portions of the pixel PX, respectively, facing the gate lines G1 and G2. Hereinafter, in order to distinguish the three sub-common electrodes CB, the sub-common electrode CB in the upper end portion in the figure is called CBU, the sub-common electrode CB in the bottom end portion is called CBB, and the sub-common electrode CB in the center in the second direction Y is called CBC.

The sub-common electrode CBU counters with the gate line G1. The sub-common electrode CBB counters with the gate line G2. The sub-common electrode CBC counters with a portion of the contact portion. In the active area or outside the active area, the sub-common electrode CBU, the sub-common electrode CBB, and the sub-common electrode CBC are electrically connected each other. That is, the common electrode CE is formed in the shape of a lattice in the active area.

In the pixel PX, the sub-common electrode CBU is arranged at the upper end portion, and the sub-common electrode CBB is arranged at the bottom end portion. Precisely, the sub-common electrode CBU is arranged striding over a boundary between the illustrated pixel and an adjoining pixel PX in the upper end portion, and the sub-common electrode CBB is arranged striding over a boundary between the illustrated pixel and an adjoining pixel PX in the lower end portion. The sub-common electrode CBC is arranged between the sub-common electrode CBU and the sub-common electrode CBB.

If its attention is paid to the positional relationship between the pixel electrode PE and the main common electrode CA, the main pixel electrode PA and the main common electrode CA are arranged by turns along the first direction X. The main pixel electrodes PA and the main common electrodes CA are arranged substantially in parallel each other. At this time, the main common electrode CAL, the main common electrode CAR, and the main common electrode CAC do not overlap with the main pixel electrodes PA in the X-Y plane.

That is, one main pixel electrode PA is arranged between the adjoining main common electrode CAL and main common electrode CAC, and between the main common electrode CAR and the main common electrode CAC. That is, the main common electrode CAL, the main common electrode CAR, and the main common electrode CAC are arranged on the both sides which sandwich the main pixel electrode PA, respectively. For this reason, the main common electrode CAL, the main pixel electrode PA, the main common electrode CAC, the main pixel electrode PA, and the main common electrode CAR are arranged along the first direction X in this order.

The distance between the pixel electrode PE and the common electrode CE is substantially the same in the first direction X. Namely, the distances between the main common electrode CAL and the main pixel electrode PA, between the main common electrode CAC and the main pixel electrode PA, and between the main common electrode CAR and the main pixel electrode PA are substantially the same in the first direction X.

The sub-pixel electrode PB, the sub-common electrode CBC and the contact portion PC are arranged by turns along the second direction Y. In FIG. 2, the sub-common electrode CBU, the sub-pixel electrode PB, the sub-common electrode CBC, the contact portion PC, and the sub-common electrode CBB are arranged from the upper end portion in this order along the second direction Y. The distances between the contact portion PC and the sub-common electrode CBC, between the sub-common electrode CBC and the sub-pixel electrode PB, and between the sub-pixel electrode PB and the sub-common electrode CBU are substantially the same, respectively.

In addition, it is desirable that the distances between the contact portion PC and the sub-common electrode CBC, between the sub-common electrode CBC and the sub-pixel electrode PB, and between the sub-pixel electrode PB and the sub-common electrode CBU are less than or equal to 50 μm.

Figure 3:
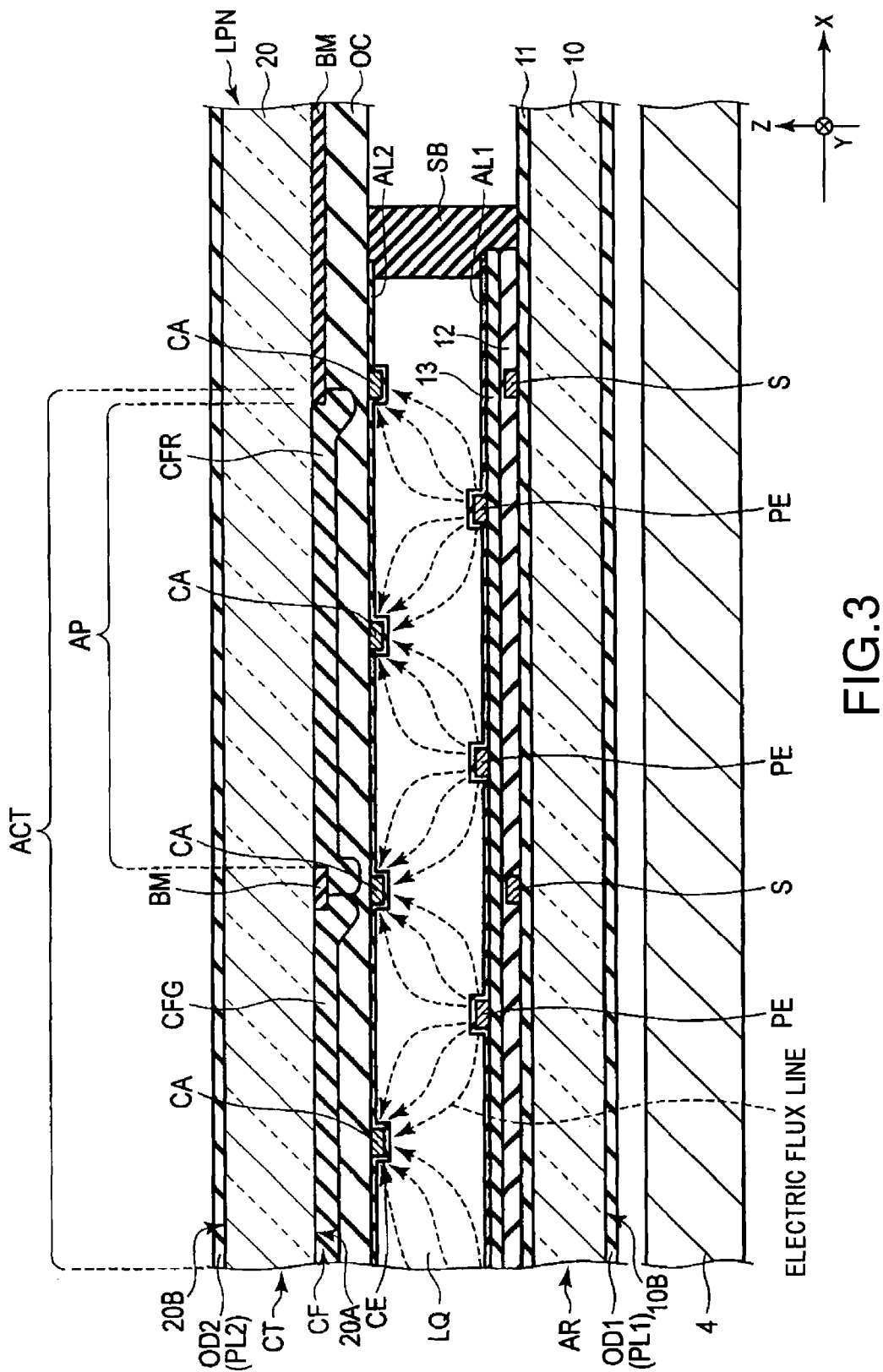
FIG. 3 is a cross-sectional view schematically showing the structure of the liquid crystal display panel taken along line III-III shown in FIG. 2.

FIG. 3 is a cross-sectional view schematically showing a cross-sectional structure taken along line III-III in the liquid crystal display panel LPN shown in FIG. 2. In addition, only a portion required for explanation is illustrated here.

A backlight 4 is arranged on the back side of the array substrate AR in the illustrated example. Various types of backlights can be used. For example, a light emitting diode (LED) and a cold cathode fluorescent lamp (CCFL), etc., can be applied as a light source of the backlight 4, and the explanation about its detailed structure is omitted.

The array substrate AR is formed using a first insulating substrate 10 which has a transmissive characteristics. The source line S is formed on a first interlayer insulating film 11, and is covered with a second interlayer insulating film 12. In addition, the gate line and the auxiliary capacitance line which are not illustrated are arranged between the first insulating substrate 10 and the first interlayer insulating film 11, for example. An overcoat layer 13 is formed on the second interlayer insulating film 12. The pixel electrode PE is formed on the overcoat layer 13. The pixel electrode PE is located inside of the pixel rather than the position on the respective adjoining source lines S.

A first alignment film AL1 is arranged on the array substrate AR facing the counter substrate CT, and extends to whole active area ACT. The first alignment film AM covers the pixel electrode PE, etc., and is also arranged on the overcoat layer 13. The first alignment film AL1 is formed of the material which shows a horizontal alignment characteristics. In addition, the array substrate AR may be further equipped with a portion of the common electrodes CE.

The counter substrate CT is formed using a second insulating substrate 20 which has a transmissive characteristics. The counter substrate CT includes a black matrix BM, a color filter CF, an overcoat layer OC, the common electrode CE, and a second alignment film AL2, etc.

The black matrix BM is formed on the second insulating substrate 20 defining each pixel PX, and forms an aperture portion AP. That is, the black matrix BM is arranged so that line portions, such as the source line S, the gate line, the auxiliary capacitance line, and the switching element, may counter the black matrix BM. Herein, though only a portion of the black matrix BM extending along the second direction Y is shown, the black matrix BM may includes a portion extending along the first direction X. The black matrix BM is formed on an internal surface 20A of the second insulating substrate 20 facing the array substrate AR.

A color filter CF is arranged corresponding to each pixel PX. That is, while the color filter CF is arranged in the aperture portion AP in the internal surface 20A of the second insulating substrate 20, a portion thereof runs on the black matrix BM. The colors of the color filters CF arranged in adjoining pixels PX in the first direction X differ mutually. For example, the color filters CF are formed of resin materials colored by three primary colors of red, blue, and green, respectively. The red color filter CFR formed of resin material colored in red is arranged corresponding to the red pixel. The blue color filter CFB formed of resin material colored in blue is arranged corresponding to the blue pixel. The green color filter CFG formed of resin material colored in green is arranged corresponding to the green pixel. The boundary between the adjoining color filters CF is located in a position which overlaps with the black matrix BM.

The overcoat layer OC covers the color filter CF. The overcoat layer OC eases influence of concave-convex of the surface of the color filter CF.

The common electrode CE is formed on the overcoat layer OC facing the array the substrate AR. The distance between the common electrode CE and the pixel electrode PE in the third direction Z is substantially the same. The third direction Z is a direction which intersects perpendicularly the first direction X and the second direction Y, i.e., a normal line direction of the liquid crystal display panel LPN.

The second alignment film AL2 is arranged on the counter substrate CT facing the array substrate AR, and extends to whole active area ACT. The second alignment film AL2 covers the common electrode CE, the overcoat layer OC, etc. The second alignment film AL2 is formed of materials which show horizontal alignment characteristics.

An alignment treatment (for example, rubbing processing or light alignment processing) is performed to the first alignment film AL1 and the second alignment film AL2 to initially align the molecules of the liquid crystal layer LQ. A first alignment treatment direction PD1 and a second alignment treatment direction PD2 in which the first alignment film AL1 and the second alignment film AL2 initially align the molecules are in parallel, and the same directions or opposite directions each other. For example, the first alignment treatment direction PD1 and the second alignment treatment direction PD2 are in parallel with the second direction Y and are the same directions each other as shown in FIG. 2.

The array substrate AR and the counter substrate CT as mentioned-above are arranged so that the first alignment film AM and the second alignment film AL2 face each other. In this case, a pillar-shaped spacer is formed integrally with one of the substrates by resin material between the first alignment film AL1 on the array substrate AR and the second alignment film AL2 on the counter substrate CT. Thereby, a predetermined gap, for example, a 2-7 μm cell gap, is formed, for example. The array substrate AR and the counter substrate CT are pasted together by seal material SB arranged outside the active area ACT, while the predetermined cell gap is formed.

The liquid crystal layer LQ is held at the cell gap formed between the array substrate AR and the counter substrate CT, and is arranged between the first alignment film AL1 and the second alignment film AL2. The liquid crystal layer LQ contains the liquid crystal molecule which is not illustrated. The liquid crystal layer LQ is constituted by positive type liquid crystal material.

A first optical element OD1 is attached on an external surface 10B of the array substrate AR, i.e., the external surface of the first insulating substrate 10 which constitutes the array substrate AR, by adhesives, etc. The first optical element OD1 is located in a side which counters with the backlight 4 of the liquid crystal display panel LPN, and controls the polarization state of the incident light which enters into the liquid crystal display panel LPN from the backlight 4. The first optical element OD1 includes a first polarizing plate PL1 having a first polarization axis (or first absorption axis) AX1.

A second optical element OD2 is attached on an external surface 20B of the counter substrate CT, i.e., the external surface of the second insulating substrate 20 which constitutes the counter substrate CT, by adhesives, etc. The second optical element OD2 is located in a display surface side of the liquid crystal display panel LPN, and controls the polarization state of emitted light from the liquid crystal display panel LPN. The second optical element OD2 includes a second polarizing plate PL2 having a second polarization axis (or second absorption axis) AX2.

The first polarization axis of the first polarizing plate PL1 and the second polarization axis of the second polarizing plate PL2 are arranged in the Cross Nicol state in which they substantially intersects perpendicularly. At this time, one polarizing plate is arranged, for example, so that the polarization axis is arranged in the initial alignment direction of the liquid crystal molecule, i.e., in orthogonal with or in parallel with the first alignment treatment direction PD1 or the second alignment treatment direction PD2. When the initial alignment direction is in parallel with the second direction Y, the polarization axis of one polarizing plate is in parallel with the second direction Y or the first direction X.

Next, the operation of the liquid crystal display panel LPN of the above-mentioned structure is explained referring to FIGS. 2 and 3.

At the time of non-electric field state (OFF), i.e., when potential difference (i.e., electric field) is not formed between the pixel electrode PE and the common electrode CE, the liquid crystal molecules LM of the liquid crystal layer LQ are aligned so that their long axis are aligned in a parallel direction with the first alignment treatment direction PD1 of the first alignment film AL1 and the second alignment treatment direction PD2 of the second alignment film AL2. In this state, the time of OFF corresponds to the initial alignment state, and the alignment direction of the liquid crystal molecule LM corresponds to the initial alignment direction.

In addition, precisely, the liquid crystal molecules LM are not exclusively aligned in parallel with the X-Y plane, but are pre-tilted in many cases. For this reason, the precise direction of the initial alignment is a direction in which an orthogonal projection of the alignment direction of the liquid crystal molecule LM at the time of OFF is carried out to the X-Y plane. Hereinafter, in order to explain simply, it is assumed that the liquid crystal molecule LM aligns in parallel with the X-Y plane, and rotates in parallel with the X-Y plane.

Here, both of the first alignment treatment direction PD 1 of the first alignment film AL1 and the second alignment treatment direction PD2 of the second alignment film AL2 are directions in parallel to the second direction Y. At the time of OFF, the long axis of the liquid crystal molecule LM is initially aligned substantially in parallel to the second direction Y as shown by a dashed line in FIG. 2. That is, the initial-alignment direction of the liquid crystal molecule LM is a direction in parallel with the second direction Y or a direction making 0° with respect to the second direction Y.

When the first alignment treatment direction PD1 and the second alignment treatment direction PD2 are in parallel and the same directions, in the cross section of the liquid crystal layer LQ, the liquid crystal molecule LM aligns substantially in a horizontal direction near an intermediate portion of the liquid crystal layer LQ (pre-tilt angle is substantially zero). That is, the liquid crystal molecule LM aligns with the pre-tilt angle in symmetrical with respect to the intermediate portion in vicinities of the first alignment film AL1 and the second alignment film AL2 (splay alignment).

Here, since the alignment treatment for the first alignment film AL1 is performed in the first alignment treatment direction PD1, the liquid crystal molecule near the first alignment film AM is initially aligned in the first alignment treatment direction PD1. Similarly, since the alignment treatment for the second alignment film AL2 is performed in the second alignment treatment direction PD2, the liquid crystal molecule near the second alignment film AL2 is initially aligned in the second alignment treatment direction PD2. When the first alignment treatment direction PD1 and the second alignment treatment direction PD2 are in parallel and the same direction, in the cross section of the liquid crystal layer LQ, the liquid crystal molecules LM becomes the splay alignment state as described above. Accordingly, the alignment of the liquid crystal molecule LM near the first alignment film AL1 on the array substrate AR becomes symmetrical with the alignment of the liquid crystal molecule LM near the second alignment film AL2 on the counter substrate CT. In the splay alignment state of the liquid crystal molecule LM, the display is optically compensated even in an inclining direction from the normal direction of the substrate by the molecules near the first alignment film AL1 and the second alignment film AL2. Therefore, when the first alignment film AL1 and the second alignment film AL2 are in parallel and the same directions mutually, there are few optical leaks in a black display. Accordingly, high contrast ratio can be realized, and it becomes possible to improve display grace.

In addition, when the first alignment film AL1 and the second alignment film AL2 are in parallel and opposite directions each other in the cross section of the liquid crystal layer LQ, the liquid crystal molecule LM aligns with a uniform pre-tilt angle in the intermediate portion of the liquid crystal layer LQ, near the first alignment film AM and near the second alignment film AL2 (homogeneous alignment).

A portion of the backlight from the backlight 4 penetrates the first polarizing plate PL1, and enters into the liquid crystal display panel LPN. The polarization state of the entered light changes with the alignment state of the liquid crystal molecule LM when the light passes the liquid crystal layer LQ. At the time OFF, the light which penetrates the liquid crystal display panel LPN is absorbed by the second polarizing plate PL2 (black display).

On the other hand, in case potential difference (or electric field) is formed between the pixel electrode PE and the common electrode CE, i.e., at the time of ON, the lateral electric field (or oblique electric field) is formed in parallel with the substrates between the pixel electrode PE and the common electrode CE. The liquid crystal molecule LM is affected by the electric field between the pixel electrode PE and the common electrode CE, and the long axis rotates in parallel with the X-Y plane as shown in a solid line in the figure.

In the example shown in FIG. 2, in the regions between the main pixel electrode PA and the main common electrode CAL, and between the main common electrode CAC and the right hand main pixel electrode PA, the liquid crystal molecule LM rotates clockwise to the second direction Y, and aligns so that it may turn to the lower left in the figure. On the other hand, in the regions between the main pixel electrode PA and the main common electrode CAR, and between the main common electrode CAC and the left hand main pixel electrode PA, the liquid crystal molecule LM rotates counter-clockwise to the second direction Y, and aligns so that it may turn to the lower right in the figure.

Thus, in each pixel PX, in case electric field is formed between the pixel electrode PE and the common electrode CE, the alignment direction of the liquid crystal molecule LM is divided into a plurality of directions by the position which overlaps with the pixel electrode PE and the common electrode CE, and domains are formed in each alignment direction. That is, a plurality of domains is formed in one pixel PX.

At the time of ON, a portion of the backlight which entered into the liquid crystal display panel LPN from the backlight 4 penetrates the first polarizing plate PL1, and enters into the liquid crystal display panel LPN. When the back light passes the liquid crystal layer LQ, the polarization state of the backlight changes in accordance with the alignment state of the liquid crystal molecule LM. At the time of ON, at least a portion of the light which passes the liquid crystal layer LQ penetrates the second polarizing plate PL2 (white display).

In addition, in the liquid crystal display device according to this embodiment, the pixel electrode PE of each pixel is arranged on the array substrate AR surrounded with the common electrode CE formed in the counter substrate CT. By arranging as shown in FIG. 3, electric flux line has a starting point and a terminal point within one pixel, and the electric flux line in one pixel does not leak to adjacent pixels. For this reason, it can be controlled that the electric field impressed to the liquid crystal layer LQ is mutually affected between the adjacent pixels. Accordingly, the liquid crystal molecules of one pixel do not move under the influence of the electric field from adjacent pixels PX in the second direction Y, and degradation of display grace can be controlled.

Moreover, by arranging the sub-pixel electrode PB and the sub-common electrode CBC respectively extending in the first direction X as mentioned above, even if it is a case where the pixel pitch becomes large and the distance between the contact portion PC and the sub-common electrode CBU becomes large, it is possible to impress sufficient electric field to the liquid crystal layer LQ, and to control the alignment state of the liquid crystal molecule LM. Therefore, in the liquid crystal display device according to this embodiment, it is avoidable that transmissivity of the display panel falls.

That is, in the liquid crystal display device according to this embodiment, it is possible to supply the liquid crystal display device which can control degradation of display grace.

In addition, the main pixel electrodes PA are connected by the sub-pixel electrode PB in this embodiment. Therefore, even if it is a case where one main pixel electrode PA is disconnected between the contact portion PC and the sub-pixel electrode PB, voltage can be impressed to the main pixel electrode PA more distant from the disconnected portion through another main pixel electrode PA and sub-pixel electrode PB. Therefore, it becomes possible to also control degradation of the display grace by the disconnection.

Moreover, since high transmissivity is obtained in the electrode gap between the pixel electrode PE and the common electrode CE according to this embodiment, it becomes possible to correspond by expanding the inter-electrode distance between the pixel electrode PE and the main common electrodes CAL and CAR, in order to make transmissivity of each pixel high enough. Moreover, in the product specifications in which the pixel pitch differs each other, the same effect as the embodiment mentioned above can be acquired by changing the inter-electrode distance and using a peak condition of a transmissivity distribution. That is, in the display mode according to this embodiment, it becomes possible to supply the display device having various pixel pitches by setting up inter-electrode distance corresponding to the product specification from low resolution with a comparatively large pixel pitch to high resolution with a comparatively small pixel pitch without necessarily using microscopic processing. Therefore, it becomes possible to realize the demand for high transmissivity and high resolution easily.

Moreover, if its attention is paid to the transmissivity distribution in the region which overlaps with the black matrix BM, the transmissivity fully falls. This is because the leak of electric field does not occur outside of the pixel from the common electrode CE, and undesired lateral electric field is not produced between the adjoining pixels on the both sides of the black matrix BM. That is, it is because the liquid crystal molecule of the region which overlaps with the black matrix BM maintains the state of initial alignment like at the OFF time (or the time of the black display). Therefore, even if it is a case where the colors of the color filter differ between the adjoining pixels, it becomes possible to control the generating of mixed colors, and also becomes possible to control the fall of color reproducibility and the contrast ratio.

Moreover, when an assembling shift occurs between the array substrate AR and the counter substrate CT, a difference may arises in distances between the respective common electrodes CE of the both sides and the pixel electrode PE. However, the alignment shift is produced in common to all the pixels PX, there is no difference in the electric field distribution between the pixels PX, and the influence to the display of the image is negligible. Even if the assembling shift arises between the array substrate AR and the counter substrate CT, it becomes possible to control the undesirable electric field leak to the adjoining pixels. For this reason, even if it is in a case where the color of the color filter differs between the adjoining pixels, it becomes possible to control generating of mixed colors, and also becomes possible to realize more genuine color reproducibility nature.

In this embodiment, the main common electrode CAR and the main common electrode CAL counter with the source lines S, respectively. In the case, the main common electrode CAL and the main common electrode CAR are arranged above the source line S1 and the source line S2, respectively, the aperture portion AP which contributes to the display can be expanded as compared with the case where the second main common electrode CAL and the second main common electrode CAR are arranged on the main pixel electrode PA side rather than above the source line S1 and the source line S2, and it becomes possible to improve the transmissivity of the pixel PX.

Moreover, it becomes possible to expand the distances between the pixel electrode PE and the second main common electrode CAL, and between the pixel electrode PE and the second main common electrode CAR by arranging each of the second main common electrodes CAL and the second main common electrode CAR above the source line S1 and the source line S2, respectively, and also becomes possible to form more horizontal electric field closer to the horizontal direction. For this reason, it becomes possible also to maintain the wide viewing angle which is advantages of the general IPS mode.

Moreover, according to this embodiment, it becomes possible to form a plurality of domains in each pixel. For this reason, a viewing angle can be optically compensated in a plurality of directions, and wide viewing angle is attained.

In addition, in the above-mentioned example, since the liquid crystal layer LQ has positive dielectric constant anisotropy, the case where the alignment direction of the liquid crystal molecule LM is in parallel to the second direction Y is explained. However, the initial alignment direction of the liquid crystal molecule LM may be the oblique direction D which obliquely crosses the second direction Y as shown in FIG. 2. Herein, the angle $\theta 1$ which the initial alignment direction D makes with the second direction Y is larger 0° and smaller than 45°. In addition, it is extremely effective to set the angle $\theta 1$ in the range of 5° to 30°, more desirably less than 20° in a viewpoint of the alignment control of the liquid crystal molecule LM. That is, it is desirable that the initial alignment direction of the liquid crystal molecule LM is set to a direction substantially in parallel with a direction in the range of 0° to 20° with respect to the second direction Y.

Moreover, although the above-mentioned example explains the case where the liquid crystal layer LQ has positive dielectric constant anisotropy, the liquid crystal layer LQ may have negative dielectric constant anisotropy. Although detailed explanation is omitted, when the negative type liquid crystal material is used, it is desirable that the above-mentioned angle θ1 is made in the range of 45° to 90°, and desirably not less than 70° because the dielectric constant anisotropy has a contrast relation between the positive type and the negative type.

Furthermore, even at the time of ON, since the lateral electric field is hardly formed (or sufficient electric field to drive the liquid crystal molecule LM is not formed) on the pixel electrode PE or the common electrode CE, the liquid crystal molecule LM hardly moves from the initial alignment direction like at the time of OFF. For this reason, as mentioned-above, even if the pixel electrode PE and the common electrode CE are formed of the electric conductive material with the light transmissive characteristics in these domains, the backlight hardly penetrates, and hardly contributes to the display at the time of ON. Therefore, the pixel electrode PE and the common electrode CE do not necessarily need to be formed of a transparent electric conductive material, and may be formed using non-transparent electric conductive materials, such as aluminum (Al), silver (Ag), and copper (Cu).

Furthermore, the common electrode CE may include a second main common electrode (shield electrode) formed on the array substrate AR facing the source line S in addition to the main common electrode CA formed on the counter substrate CT. The second main common electrode extends substantially in parallel with the main common electrode CA and is set to the same potential as the main common electrode CA. It becomes possible to shield undesirable electric field from the source line S by providing the second main common electrode.

Moreover, the common electrode CE may include a second sub-common electrode (shield electrode) formed on the array substrate AR facing the gate line G or the auxiliary capacitance line C in addition to the main common electrode CA formed on the counter substrate CT. The second sub-common electrode extends in a direction crossing the main common electrode CA and is set to the same potential as the main common electrode CA. It becomes possible to shield undesirable electric field from the gate line G or the auxiliary capacitance line C by providing the second sub-common electrode. It becomes possible further to control the decrease of the display quality according to the structure in which the second main common electrode and the second sub-common electrode are provided.

As explained above, according to this embodiment, it becomes possible to supply the liquid crystal display device which can control degradation of display grace.

Next, the liquid crystal display device according to a second embodiment is explained with reference to drawings. In addition, in the following explanation, the same mark is attached to the same composition as the above-mentioned first embodiment, and its explanation is omitted.

Figure 4:
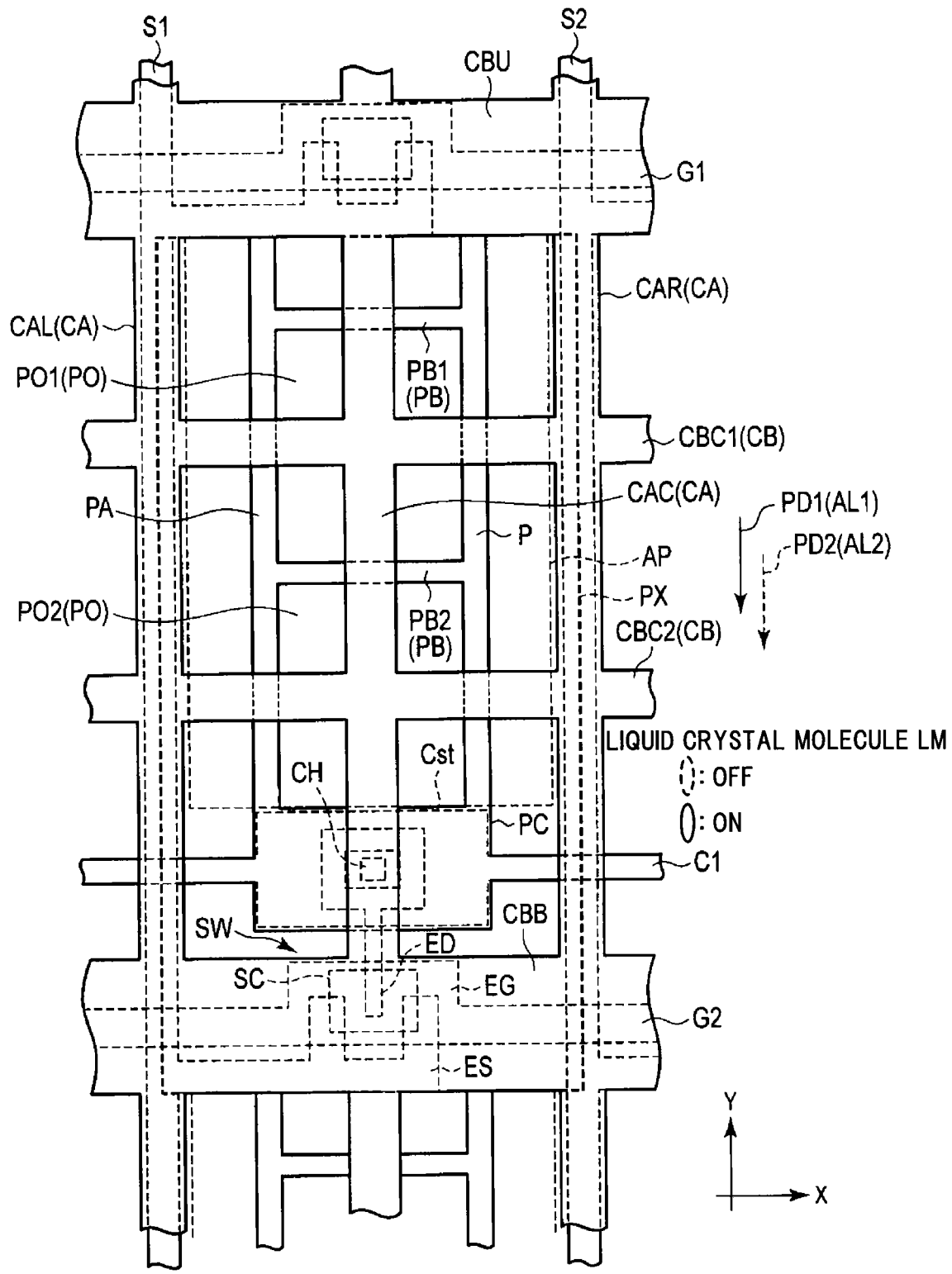
FIG. 4 is a plan view schematically showing a structure of one pixel when the display panel shown in FIG. 1 is seen from the counter substrate side according to a second embodiment.

FIG. 4 is a plan view schematically showing a structure of one pixel when the display panel shown in FIG. 1 is seen from the counter substrate side according to a second embodiment. In this embodiment, the pixel electrode PE of the pixel PX is equipped with the sub-pixel electrode PB and the sub-common electrode CB. In addition, the width of the pixel PX in the first direction X is approximately 70 μm, and the width of pixel PX in the second direction Y is approximately 210 μm.

In the case shown in FIG. 4, the pixel pitch is still larger and the distance between the contact portion PC and the sub-common electrode CBU in the second direction Y is still larger. Therefore, the number of the sub-common electrodes CBC and the sub-pixel electrodes PB which are arranged between contact portion PC and the sub-common electrode CBU is increased.

Practically, the pixel electrode PE has two sub-pixel electrodes PB arranged between the contact portion PC and the sub-common electrode CBU extending in the first direction X. Hereinafter, for explanation, an upper sub-pixel electrode (sub-common electrode CBU side) is called PB1, and a lower sub-pixel electrode (contact portion PC side) is called PB2.

An aperture PO surrounded by the electrodes extending in the first direction X and the electrodes extending in the second direction Y is formed in the pixel PX. In the embodiment shown in FIG. 4, an aperture PO1 surrounded by two main pixel electrodes PA, the sub-pixel electrode PB1 and the sub-pixel electrode PB2, and an aperture PO2 surrounded by the contact portion PC, two main pixel electrodes PA, and the sub-pixel electrode PB2 are formed. The apertures PO1 and PO2 are located in a line in the second direction Y.

The common electrode CE includes two sub-common electrodes CB arranged between the contact portion PC and the sub-common electrode CBU. Hereinafter, for explanation, the upper sub-common electrode CB (sub-common electrode CBU side) is called CBC1, and a lower sub-common electrode (contact portion PC side) is called CBC2.

The contact portion PC, the sub-common electrode CB and the sub-pixel electrode PB are arranged by turns along the second direction Y. In FIG. 4, the sub-common electrode CBU, the sub-pixel electrode PB1, the sub-common electrode CBC1, the sub-pixel electrode PB2, the sub-common electrode CBC2, the contact portion PC, and the sub-common electrode CBB are arranged from the upper portion along with the second direction Y in this order. In the second direction Y, the distance between the contact portion PC and the sub-common electrode CBC2, the distance between the sub-common electrode CBC2 and the sub-pixel electrode PB2, the distance between the sub-pixel electrode PB2 and the sub-common electrode CBC1, the distance between the sub-common electrode CBC1 and the sub-pixel electrode PB1, and between the sub-pixel electrode PB1 and the sub-common electrode CBU are substantially equal each other. It is desirable that the respective distances are set to 50 μm or less.

The compositions other than the above in this embodiment is the same as those of the first embodiment shown in FIG. 2, and the second embodiment can achieve substantially the same effect as the first embodiment.

Moreover, even if the pixel pitch becomes still larger and the distance between the contact portion PC and the sub-common electrode CBU also becomes still larger, it is possible to impress sufficient electric field to the liquid crystal layer LQ, and to control the alignment state of the liquid crystal molecule LM by increasing the number of the sub-pixel electrode PB and the sub-common electrodes CB extending in the first direction X. Therefore, in the liquid crystal display according to this embodiment, it is avoidable that transmissivity of the display panel falls.

Figure 5:
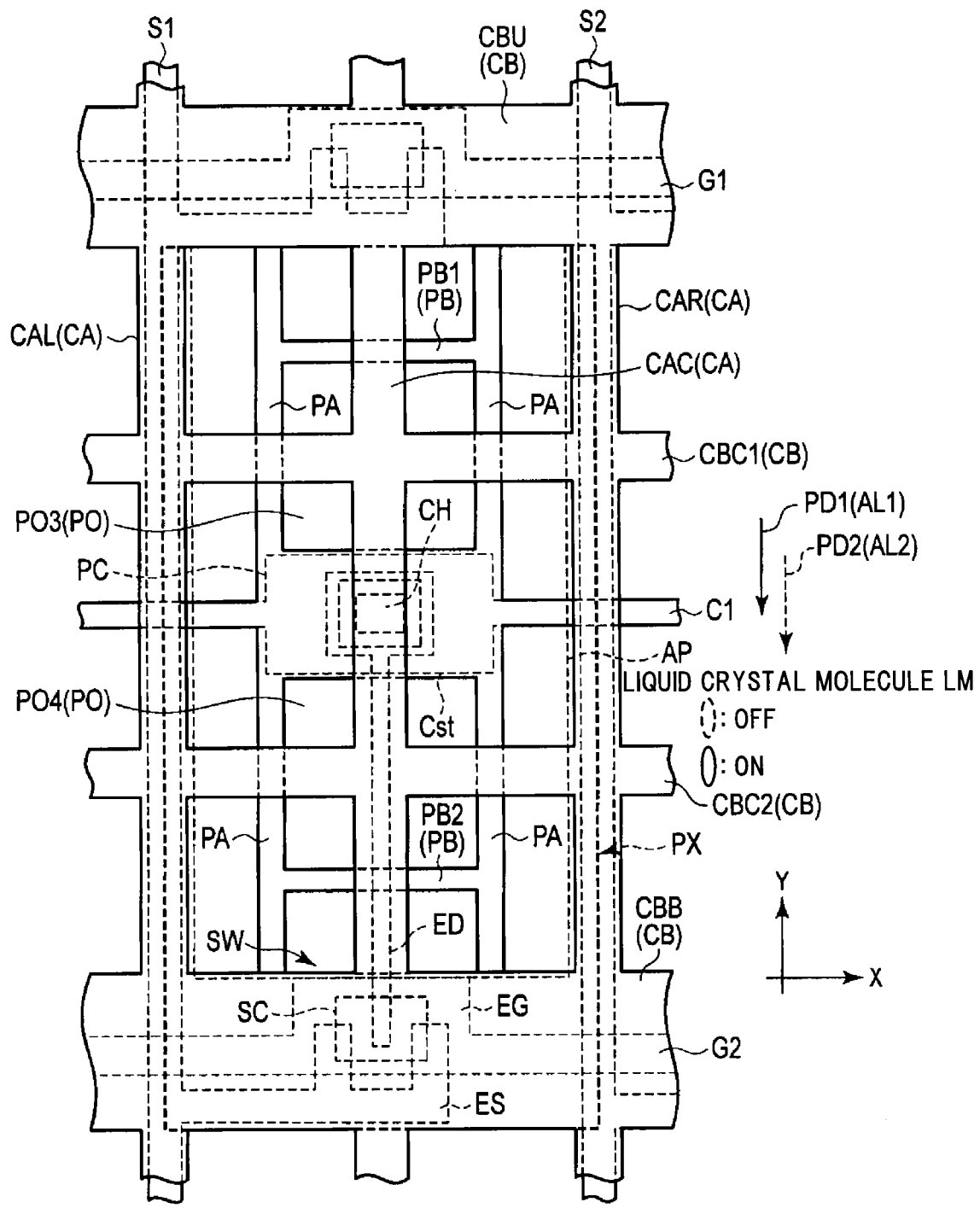
FIG. 5 is a plan view schematically showing a structure of one pixel when the display panel shown in FIG. 1 is seen from the counter substrate side according to a third embodiment.

Next, the liquid crystal display device according to a third embodiment is explained with reference to drawings. FIG. 5 is a plan view schematically showing a structure of one pixel when the display panel shown in FIG. 1 is seen from the counter substrate side according to a third embodiment. In addition, the width of the pixel PX in the first direction X is approximately 70 μm, and the width of pixel PX in the second direction Y is approximately 210 μm.

According to this embodiment, the contact portion PC is arranged in the central portion of the pixel PX in the second direction Y. The contact portion PC is arranged in the central portion between the main common electrode CAL and the main common electrode CAR in the first direction X, and in the central portion between the sub-common electrode CBU and the sub-common electrode CBB in the second direction Y. The capacitance portion CsT of the auxiliary capacitance line C is also arranged overlapping with the contact portion PC.

The pixel electrode PE is equipped with two main pixel electrodes PA, two sub-pixel electrodes PB, and the contact portion PC. The contact portion PC is formed more broadly than the main pixel electrode PA. The contact portion PC is formed in a rectangular shape having two ends respectively facing the source lines S.

The main pixel electrodes PA linearly extend from the contact portion PC along the ends facing the source lines to the upper end portion and the lower end portion of the pixel PX. In the example shown in FIG. 5, two main pixel electrodes PA linearly extend from the contact portion PC to the upper end portion of the pixel PX, and two main pixel electrodes PA linearly extend to the bottom end portion.

The sub-pixel electrodes PB are arranged between the contact portion PC and the sub-pixel electrode CBU, and between the contact portion and the sub-common electrode CBB and extends in the first direction X, respectively. The sub-pixel electrodes PB connect between the main pixel electrodes PA. In the following explanation, the sub-pixel electrode arranged between the contact portion PC and the sub-common electrode CBU is called PB1, and the sub-pixel electrode arranged between the contact portion PC and the sub-common electrode CBB is called PB2.

An aperture PO surrounded by the electrodes extending in the first direction X and the electrodes extending in the second direction Y is formed. In the example shown in FIG. 5, an aperture PO3 surrounded by two main pixel electrodes PA, the sub-pixel electrode PB1 and the contact portion PC, and an aperture PO4 surrounded by two main pixel electrodes PA, the sub-pixel electrode PB2 and the contact portion PC are formed. The apertures PO3 and PO4 are located in a line in the second direction Y.

The drain electrode ED of the switching element SW extends from the semiconductor layer SC to under the contact portion PC so as to counter with the main common electrode CAC, and is electrically connected with the contact portion PC in the contact hole CH.

The common electrode CE is equipped with two sub-common electrodes CB other than the sub-common electrode CBU and the sub-common electrode CBB. Hereinafter, in order to distinguish the sub-common electrodes CB, the sub-common electrode arranged between the contact portion PC and the sub-pixel electrode PB1 is called CBC1, and the sub-common electrode arranged between the contact portion PC and the sub-pixel electrode PB2 is called CBC2.

The sub-common electrodes CBC1 and CBC2 linearly extend along the first direction X orthogonally crossing the main pixel electrodes PA. The sub-common electrodes CBC1 and CBC2 are formed in the shape of a belt with the same width along the second direction Y.

The sub-common electrode CBU counters with the gate line G1, and the sub-common electrode CBB counters with the gate line G2. In the active area or out of the active area, the sub-common electrodes CBU, CBB, CBC1, and CBC2 are electrically connected mutually.

The contact portion PC, the sub-pixel electrode PB, and the sub-common electrode CB are arranged by turns along the second direction Y. In FIG. 5, the sub-common electrode CBU, the sub-pixel electrode PB1, the sub-common electrode CBC1, the contact portion PC, the sub-common electrode CBC2, the sub-pixel electrode PB2 and the sub-common electrode CBB are arranged in this order from the upper end portion along with the second direction Y. In the second direction Y, the distance between the contact portion PC and the sub-common electrode CBC (CBC1, CBC2), the distance between the sub-common electrode CBC and sub-pixel electrode PB (PB1, PB2) and the distance between the sub-pixel electrode PB and the sub-common electrode CBU (CBB) are substantially equal each other. It is desirable that the distances are set to 50 µm or less, respectively.

The compositions other than the above according to this embodiment is the same as those of the first embodiment, and this embodiment can achieve substantially the same effect as the first embodiment.

Moreover, by arranging the sub-pixel electrode PB and the sub-common electrode CBC respectively extending in the first direction X as mentioned above, even if it is a case where the pixel pitch becomes large, and the distances between the contact portion PC and the sub-common electrode CBU and between the contact portion PC and the sub-common electrode CBB become large, it is possible to impress sufficient electric field to the liquid crystal layer LQ, and to control the alignment state of the liquid crystal molecule LM. Therefore, in the liquid crystal display device according to this embodiment, it is avoidable that transmissivity of the display panel falls.

According to the liquid crystal display device in this embodiment, it is possible to supply the liquid crystal display device which can control degradation of display grace like the first embodiment.

In the above-mentioned embodiments, though the pixel electrode PE is provided with two or four main pixel electrodes PA which extend in the second direction Y, the number of the main pixel electrodes PA is not limited to this example. In case the width of the pixel becomes larger than the above embodiments, three or six main pixel electrodes PA extending from the contact portion to the upper side or lower side may be provided. The number of the sub-pixel electrodes PB and the sub-common electrodes CB can be changeable corresponding to the pitch size.

Figure 6:
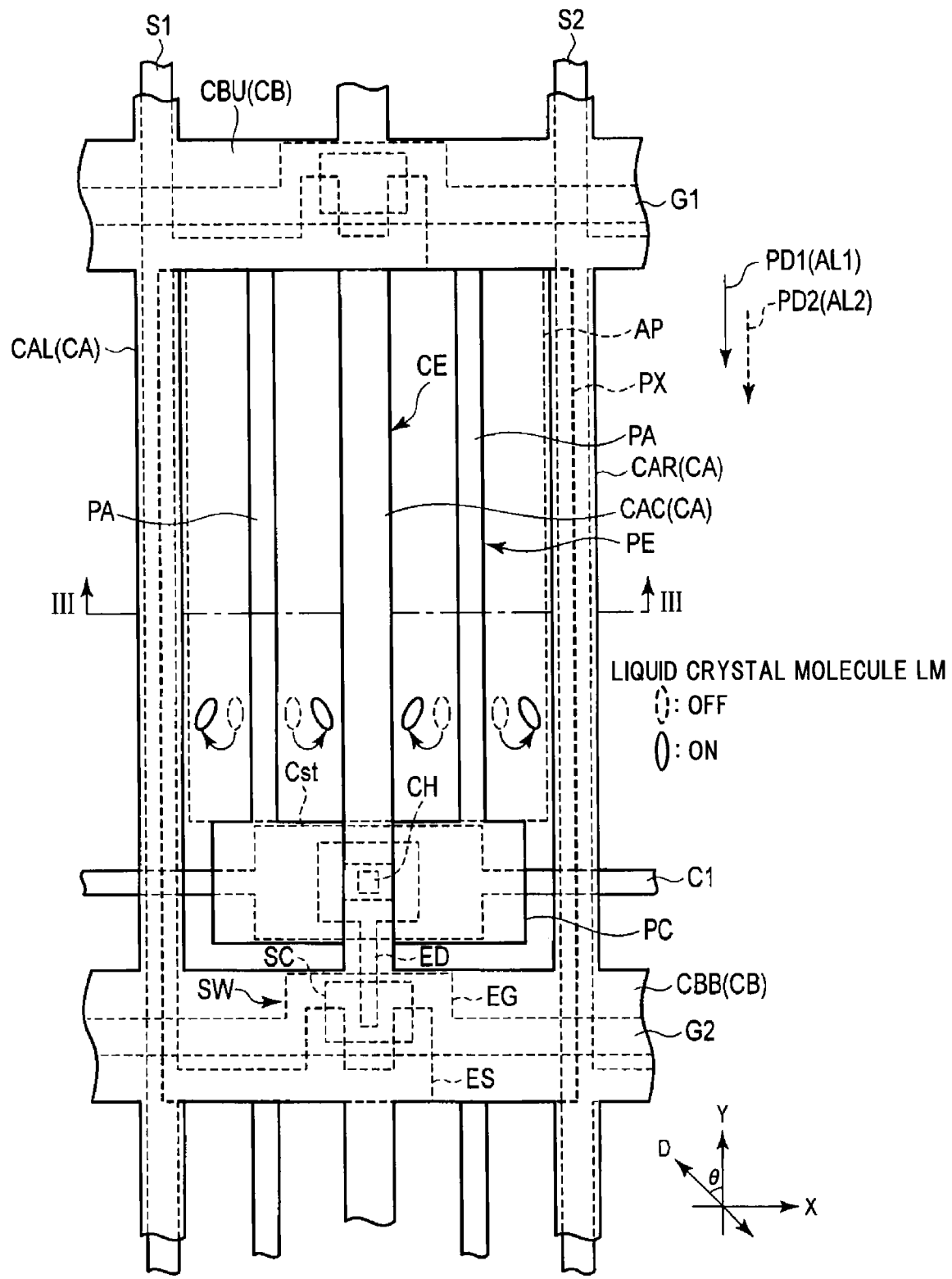
FIG. 6 is a plan view schematically showing a structure of one pixel when the display panel shown in FIG. 1 is seen from the counter substrate side according to a fourth embodiment.

FIG. 6 is a plan view schematically showing the structure of one pixel when the liquid crystal display panel according to a fourth embodiment is seen from the counter substrate side. Herein, a plan view in the X-Y plane specified in the first direction X and the second direction Y is shown.

The pixel PX has the shape of a rectangle whose length in the first direction X is shorter than the length in the second direction Y. In addition, according to this embodiment, the width of the pixel PX in the first direction X is approximately 40 µm, and the width of the pixel PX in the second direction Y is approximately 120 µm.

The pixel electrode PE is equipped with a pair of main pixel electrodes PA and the contact portion PC which are electrically connected mutually. The contact portion PC is arranged near the bottom end portion (near the switching element SW connected to the pixel electrode PE) of the pixel PX. The contact portion is formed in the rectangular shape having two ends facing the source lines S. The pair of main pixel electrodes respectively extends to the upper end portion from two locations of the contact portion which are apart from the ends thereof to a center side of the pixel PX. That is, in the first direction X, the ends of the contact portion PC extend and project to a source line S1 and S2 side beyond the ends of the main pixel electrodes PA. In addition, the ends of the contact portion PC may extend to the source line S1 and S2 side so that the ends of the contact portion PC are not electrically connected with the pixel electrode of the pixel which adjoins in the first direction X, and may extend on the source lines S1 and S2.

The region between the main common electrode CAL and the main pixel electrode PA are surrounded with the contact portion PC, the main pixel electrode PA, the main common electrode CAL, and the sub-common electrode CBU by extending the contact portion PC on the source line S1 side while the region between the main common electrode CAC and the main pixel electrode PA are surrounded with the contact portion PC, the main pixel electrode PA, the main common electrode CAC, and the sub-common electrode CBU. Similarly, the region between the main common electrode CAR and the main pixel electrode PA are surrounded with the contact portion PC, the main pixel electrode PA, the main common electrode CAR, and the sub-common electrode CBU by extending the contact portion PC on the source line S2 side while the region between the main common electrode CAC and the main pixel electrode PA are surrounded with the contact portion PC, the main pixel electrode PA, the main common electrode CAC, and the sub-common electrode CBU. Thereby, substantially the same electric field as that between the main common electrode CAC and the main pixel electrode PA is impressed to both regions between the main common electrode CAL and the main pixel electrode PA, and between the main common electrode CAR and the main pixel electrode PA. Accordingly, in the liquid crystal display device according to this embodiment, it becomes possible to sufficiently control the alignment state even on the end side of the pixel PX in the first direction X and to avoid the lowering of the transmissivity of the display panel. That is, in the liquid crystal display device according to this embodiment, it is possible to supply the liquid crystal display device which can control the degradation of display grace.

Figure 11:
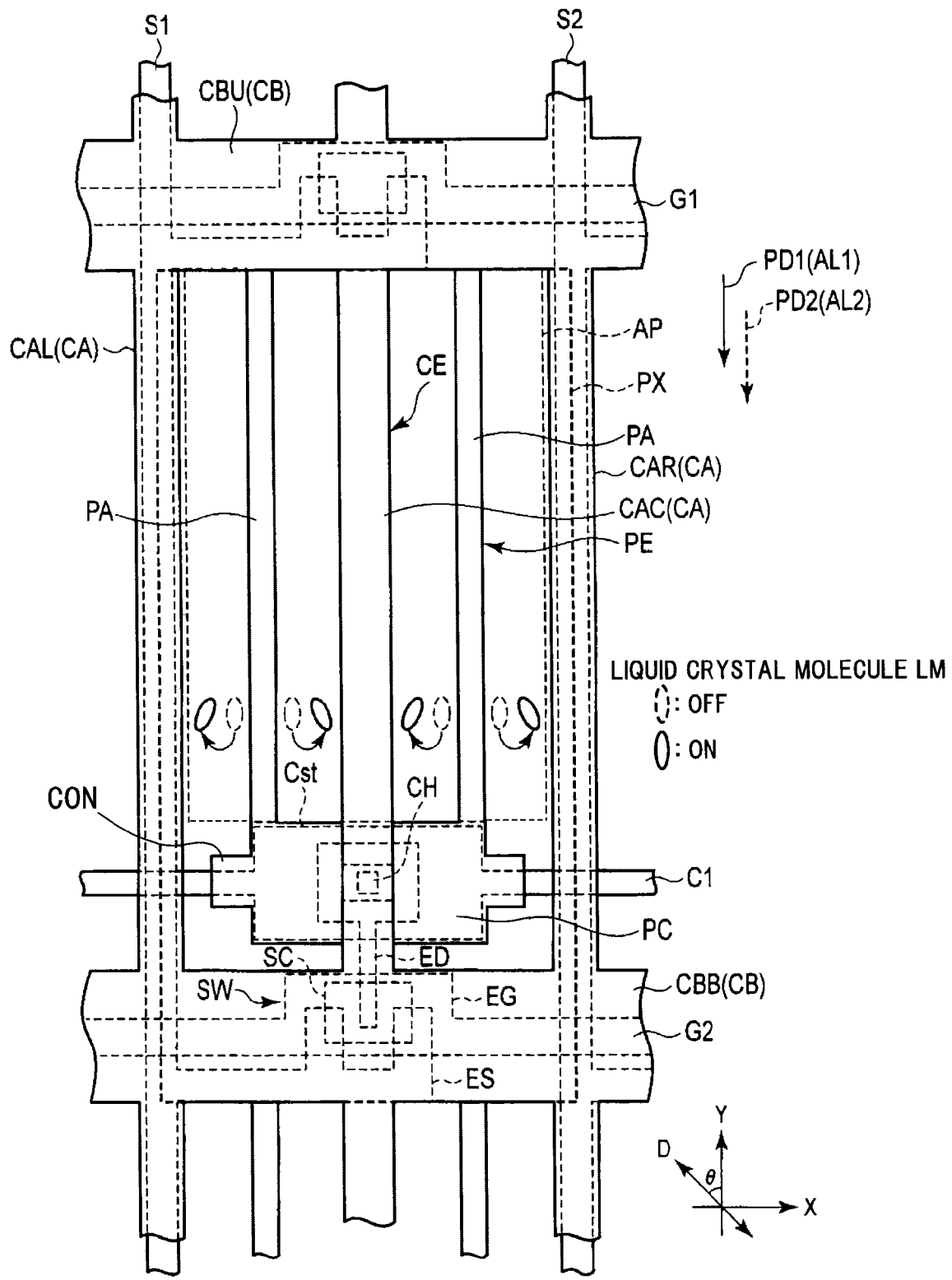
FIG. 11 is a plan view schematically showing a structure of one pixel when the display panel shown in FIG. 1 is seen from the counter substrate side according to a modification of the liquid crystal display panel shown in FIG. 6.

In addition, in the case shown in FIG. 6, while the ends of the contact portion PC facing the source lines S1 and S2 extend beyond the ends of the main pixel electrodes PA, at least a portion of the respective ends of the contact portion PC facing the source lines S1 and S2 may extend on the source line S1 and S2 side. That is, the contact portion PC may be equipped with a convex portion CON formed in the ends facing the source lines S1 and S2 projecting in the first direction X beyond the ends of the main pixel electrodes PA as shown in FIG. 11. In that case, substantially the same effect as the above-mentioned embodiment can be acquired.

Figure 7:
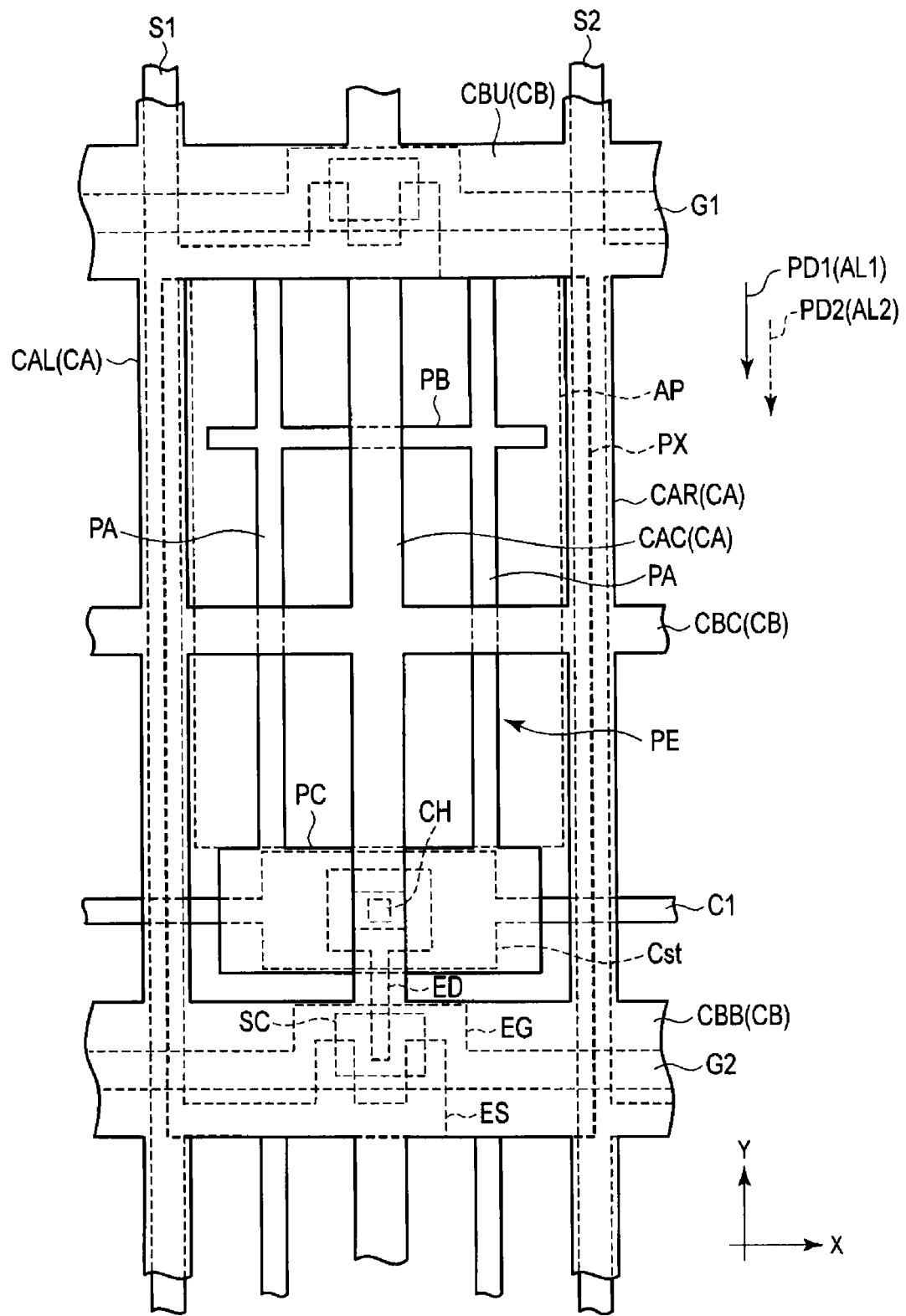
FIG. 7 is a plan view schematically showing a structure of one pixel when the display panel shown in FIG. 1 is seen from the counter substrate side according to a fifth embodiment.

Next, the liquid crystal display device according to a fifth embodiment is explained with reference to drawings. FIG. 7 is a plan view schematically showing the structure of one pixel when the liquid crystal display panel is seen from the counter substrate side. In addition, in the following explanation, the same mark is attached about the same composition as the above-mentioned embodiment, and its explanation is omitted.

In this embodiment, the pixel electrode PE of the pixel PX is equipped with the sub-pixel electrode PB. In addition, in this embodiment, the width of the pixel PX in the first direction X is approximately 50 μm, and the width of the pixel PX in the second direction Y is approximately 150 μm.

In this embodiment, the contact portion PC is arranged in the bottom end portion of the pixel PX. The sub-pixel electrode PB is arranged extending in the first direction X between the contact portion PC and the upper end portion of the pixel PX. The sub-pixel electrode PB extends in the first direction X so as to connect between the main pixel electrodes PA.

In the pixel, an opening PO surrounded by the electrodes extending in the first direction X and the electrodes extending in the second direction Y is formed, and the electrodes extending in the first direction X project from the ends of the main pixel electrodes PA extending in the second direction Y. In the embodiment shown in FIG. 7, the opening PO surrounded with the contact portion PC, two main pixel electrodes PA, and the sub-pixel electrode PB is formed in the pixel PX. The opening PO is formed substantially in the rectangular shape. In the first direction X, the ends of the sub-pixel electrode PB extend and project to the source line S1 and S2 side beyond the ends of the main pixel electrodes PA.

In addition, the sub-pixel electrode PB may extend to the source line S1 and S2 side so that the ends of the sub-pixel electrode PB are not electrically connected with the pixel electrodes of the pixels PX which adjoin in the first direction X, and may extend on the source lines S1 and S2. When a second main common electrode facing the source line S is provided in the array substrate AR, the contact portion PC and the sub-pixel electrode PB of the pixel electrode PE may extend on the source line S1 and S2 side in the first direction X beyond the main pixel electrodes PA so that the contact portion PC and the sub-pixel electrode PB are not electrically connected with the second main common electrode.

If its attention is paid to the positional relationship between the pixel electrode PE and the main common electrode CA, the main pixel electrode PA and the main common electrode CA are arranged by turns along the first direction X. The main pixel electrode PA and the main common electrode CA are arranged in parallel each other. At this time, the main common electrode CAL, the main common electrode CAR, and the main common electrode CAC do not overlap with the main pixel electrode PA in the X-Y plane.

In addition, it is desirable that the distances between the contact portion PC and the sub-common electrode CBC, between the sub-common electrode CBC and the sub-pixel electrode PB, and between the sub-pixel electrode PB and the sub-common electrode CBU in the second direction Y are 50 μm or less, respectively.

In the liquid crystal display device according to this embodiment, the other structures are the same as those of the above-mentioned first embodiment, and can achieve the same effect as the fourth embodiment.

As mentioned above, even if it is a case where the pixel pitch becomes large and the distance between the contact portion PC and the sub-common electrode CBU becomes large, it becomes possible to impress sufficient electric field to the liquid crystal layer LQ, and to control the alignment state of the liquid crystal molecule LM by arranging the sub-pixel electrode PB and the sub-common electrode CBC which project to the source line side in the first direction X. In an opening portion surrounded with the main common electrode CAL, the main common electrode CAC, the sub-common electrode CBC, and the sub-common electrode CBU in FIG. 7, the pixel electrode PE is formed in the shape of a cross made by the main pixel electrode PA and the sub-pixel electrode PB. Similarly, in an opening portion surrounded with the main common electrode CAR, the main common electrode CAC, the sub-common electrode CBC, and the sub-common electrode CBU, the pixel electrode PE is formed in the shape of a cross made by the main pixel electrode PA and the sub-pixel electrode PB. Thus, in the openings surrounded with the common electrodes on the counter substrate, it becomes possible to control the liquid crystal layer LQ in the stable alignment state any time when sufficient voltage is impressed to the liquid crystal layer without generating disclination by providing some regions in which the pixel electrode is formed in the cross shape.

Furthermore, in this embodiment, the contact portion PC of the pixel electrode PE extends to the source line S1 and S2 side beyond the ends of the main pixel electrodes PA in the first direction X. The sub-pixel electrode PB also extends to the source line S1 and S2 side beyond the main pixel electrodes PA in the first direction X.

Thus, according to this embodiment, in a lower half region of the pixel, a region between the main common electrode CAL and the main pixel electrode PA is surrounded with the contact portion PC, the main pixel electrode PA, the main common electrode CAL, and the sub-common electrode CBC by extending the contact portion PC to the source line S1 side while the region between the main common electrode CAC and the main pixel electrode PA is surrounded with the contact portion PC, the main pixel electrode PA, the main common electrode CAC, and the sub-common electrode CBC. Similarly, the region between the main common electrode CAR and the main pixel electrode PA is surrounded with the contact portion PC, the main pixel electrode PA, the main common electrode CAR, and the sub-common electrode CBC by extending the contact portion PC to the source line S2 side while the region between the main common electrode CAC and the main pixel electrode PA is surrounded with the contact portion PC, the main pixel electrode PA, the main common electrode CAC, and the sub-common electrode CBC. Thereby, substantially the same electric field as that between main common electrode CAC and the main pixel electrode PA is impressed to both regions between the main common electrode CAL and the main pixel electrode PA, and between the main common electrode CAR and the main pixel electrode PA. That is, sufficient electric field is impressed even to the regions along the source lines.

Similarly, in an upper half region of the pixel, a region between the main common electrode CAL and the main pixel electrode PA is divided into two regions. One region is surrounded with the main common electrode CAL, the sub-common electrode CBC, the main pixel electrode PA and the sub-pixel electrode PB. Another region is surrounded with the sub-common electrode CBU, the main pixel electrode PA, the sub-pixel electrode PB and the main common electrode CAL. Similarly, a region between the main common electrode CAR and the main pixel electrode PA is divided into two regions. One region is surrounded with the main common electrode CAR, the sub-common electrode CBC, the main pixel electrode PA and the sub-pixel electrode PB. Another region is surrounded with the sub-common electrode CBU, the main pixel electrode PA, the sub-pixel electrode PB and the main common electrode CAR. On the other hand, the region between the main common electrode CAC and the main pixel electrode PA is divided into two regions. One region is surrounded with the sub-common electrode CBC, the main common electrode CAC, the main pixel electrode PA, and the sub-pixel electrode PB. Another region is surrounded with the main common electrode CAC, sub-common electrode CBU, the main pixel electrode PA and the sub-pixel electrode PB. Therefore, substantially the same electric field is impressed to the eight openings formed of the pixel electrode PE and the common electrode CE. Accordingly, in the upper region, substantially the same electric field is impressed to the eight openings. That is, sufficient electric field is impressed even to the regions along the source lines.

Therefore, in the liquid crystal display device according to this embodiment, it becomes possible to fully control the alignment state of the liquid crystal molecule LM along the ends of the pixel PX in the first direction, and to avoid the lowering of the transmissivity of the display panel. That is, it becomes possible to supply the liquid crystal display device which can control degradation of display grace like the first embodiment.

Figure 8:
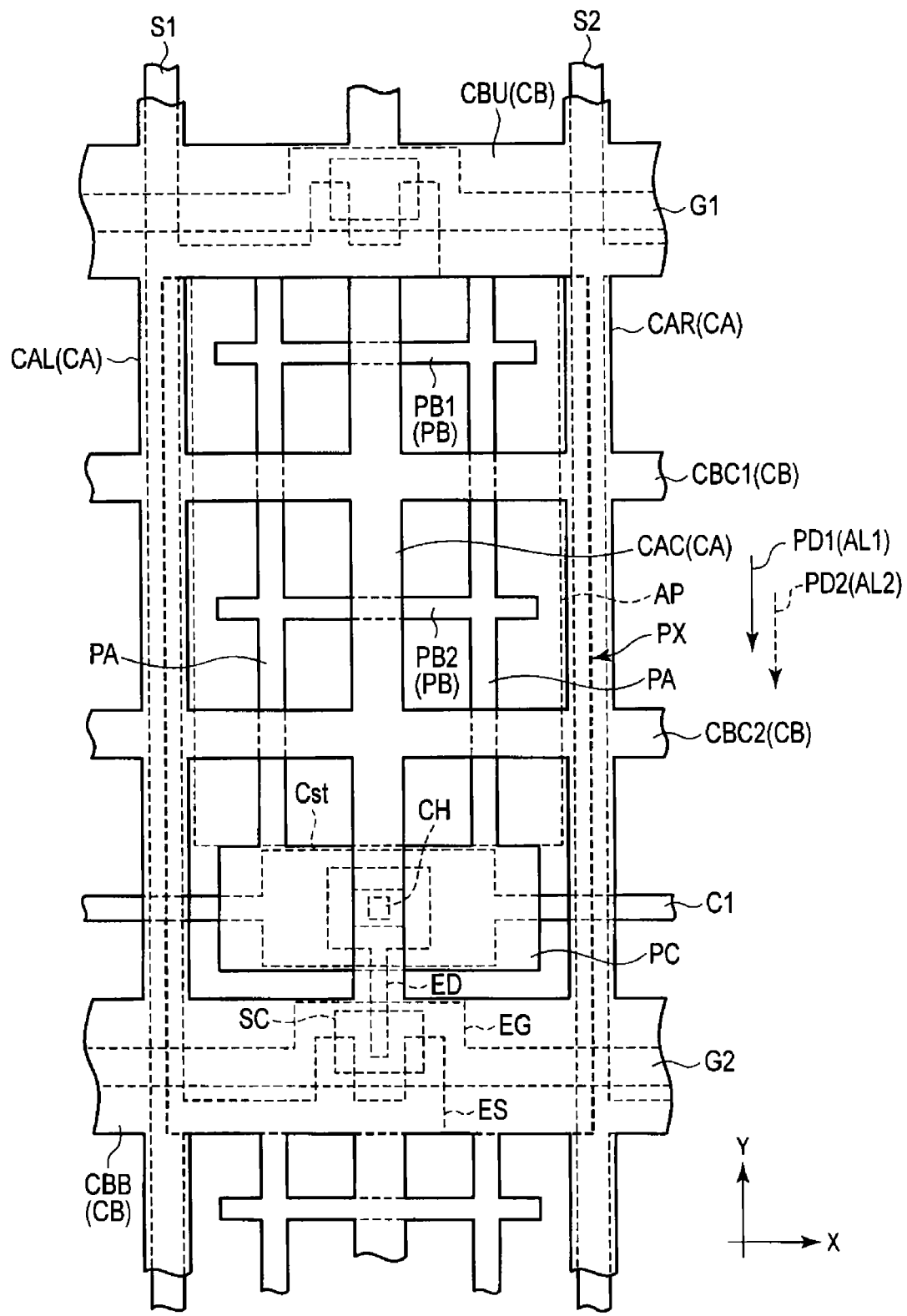
FIG. 8 is a plan view schematically showing a structure of one pixel when the display panel shown in FIG. 1 is seen from the counter substrate side according to a sixth embodiment.

FIG. 8 is a plan view schematically showing the structure of one pixel when the liquid crystal display panel is seen from the counter substrate side according to a sixth embodiment. In this embodiment, the pixel electrode PE of the pixel PX is equipped with the sub-pixel electrode PB. In addition, in this embodiment, the width of the pixel PX in the first direction X is approximately 75 µm, and the width of the pixel PX in the second direction Y is approximately 230 µm.

In this embodiment shown in FIG. 8, the pixel pitch becomes still larger and the distance between the contact portion PC and the sub-common electrode CBU is still larger in the second direction Y. Therefore, the number of the sub-common electrodes CBC and sub-pixels PB arranged between the contact portion PC and the sub-common electrode CBU is increased.

In this embodiment, the contact portion PC is arranged in the lower end portion of the pixel PX. In the pixel PX, further, another sub-pixel electrode PB2 and another sub-common electrode CBC2 are provided extending in the first direction X, and the electrodes extending in the first direction X project from the ends of the electrodes extending in the second direction Y. In the first direction X, the ends of the contact portion PC, the sub-pixel electrode PB1, and the sub-pixel electrode PB2 project from the ends of the main pixel electrodes PA. The sub-common electrode CBU, the sub-pixel electrode PB1, the sub-common electrode CBC1, the sub-pixel electrode PB2, the sub-common electrode CBC2, and the contact portion PC are arranged in the second direction Y from the upper end portion of the pixel PX in this order.

The structures according to this embodiment other than the above are the same as those of the pixel PX shown in FIG. 7. The liquid crystal display device according to this embodiment can achieve the same effect as the fifth embodiment.

As mentioned above, even if it is a case where the pixel pitch becomes large and the distance between the contact portion PC and the sub-common electrode CBU also becomes large, it is possible to impress sufficient electric field to the liquid crystal layer LQ, and to control the alignment state of the liquid crystal molecule LM by increasing the number of the sub-pixel electrodes PB and the sub-common electrodes CB which extend in the first direction X. In the opening portion surrounded with the main common electrodes CA formed on the counter substrate CT, the pixel electrodes PE is formed in the shape of a cross made of the main pixel electrode PA and sub-pixel electrode PB in the array substrate. By providing some crossing portions, it becomes possible to control the liquid crystal layer LQ in the stable alignment state any time when sufficient voltage is impressed to the liquid crystal layer. Accordingly, it is possible to avoid the lowering of the transmissivity of the display panel.

According to this embodiment, even if the pitch becomes larger, electric field is sufficiently impressed even to the ends of the pixel along the source line. Therefore, it becomes possible to fully control the alignment state of the liquid crystal molecule LM also in the end of the pixel PX in the first direction X, and to avoid the lowering of the transmissivity of the display panel. That is, it becomes possible to supply the liquid crystal display device which can control degradation of display grace like the first embodiment.

Figure 9:
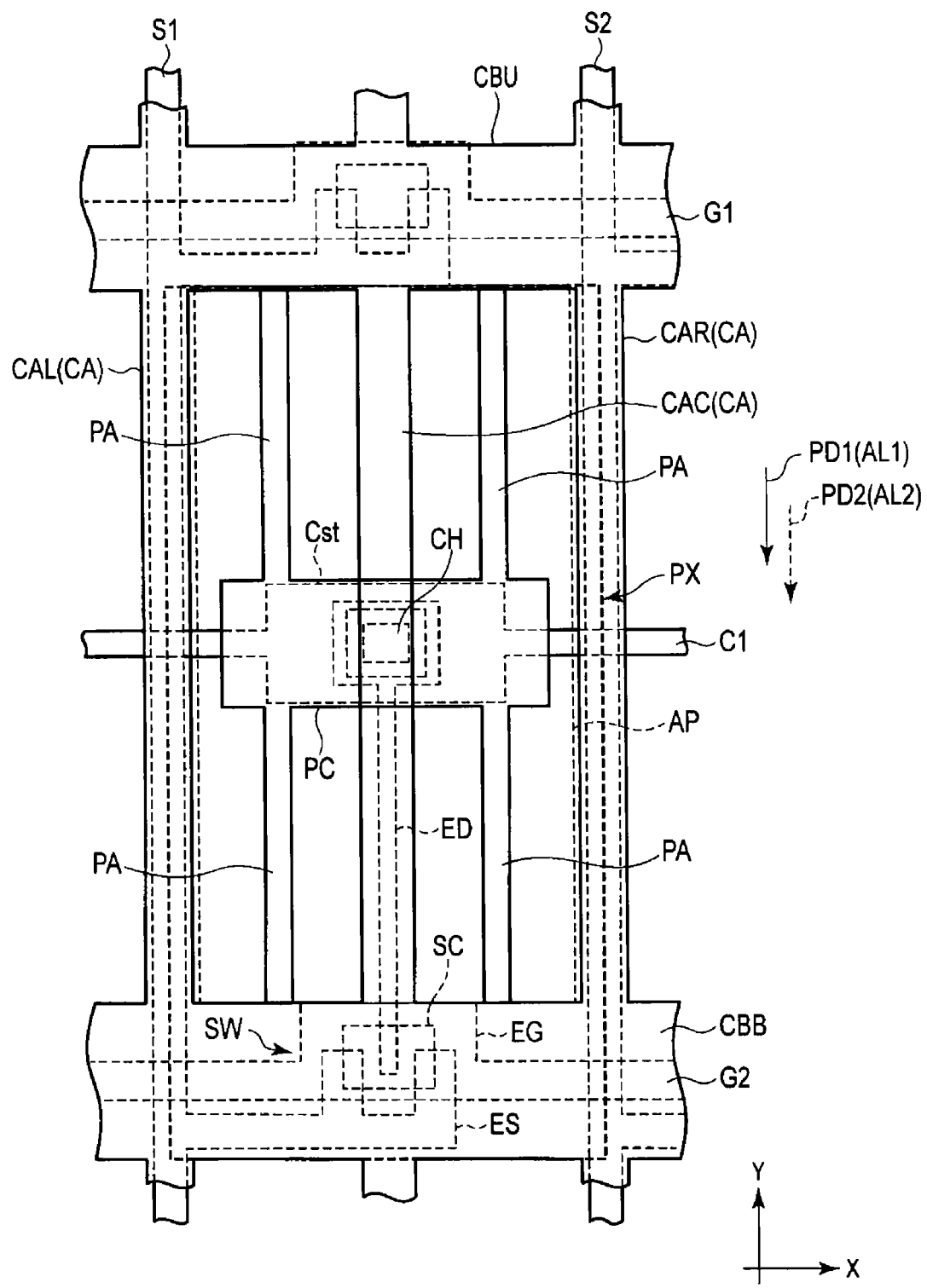
FIG. 9 is a plan view schematically showing a structure of one pixel when the display panel shown in FIG. 1 is seen from the counter substrate side according to a seventh embodiment.

Next, the liquid crystal display device according to a seventh embodiment is explained with reference to drawings. FIG. 9 is a plan view schematically showing the structure of one pixel when the liquid crystal display panel is seen from the counter substrate side. The width of the pixel PX in the first direction X is approximately 50 µm, and the width of the pixel PX in the second direction Y is approximately 150 µm.

The pixel electrode PE includes the main pixel electrode PA and the contact portion PC. The contact portion PC is arranged in the center portion of the pixel PX between the sub-common electrode CBU and the sub-common electrode CBB, and faces the capacitance portion CsT. The contact portion PC is formed more widely than the main pixel electrode PA.

The main pixel electrodes PA linearly extend along the second direction Y from four inside portions of the contact portion PC apart from the ends facing the source lines S1 and S2 to the upper end portion and the lower end portion of the pixel PX, respectively. Two main pixel electrodes PA extend from the contact portion PC to the upper end portion, and two main pixel electrodes PA extend to the bottom end portion. In the first direction X, the ends of the contact portion PC extend to the source line S1 and S2 side beyond the ends of the main pixel electrodes PA. In addition, the ends of the contact portion PC may extend on the source line S1 and S2 so that the ends of the contact portion PC are not electrically connected with the pixel electrode of the pixel which adjoins in the first direction X.

The structures other than the above according to this embodiment are the same as those of the pixel PX according to the fourth embodiment. The liquid crystal display device according to this embodiment can achieve the same effect as the fourth embodiment.

According to this embodiment, sufficient voltage can be impressed even in the region along the ends of the pixel PX, and the alignment state of the liquid crystal molecule LM can be controlled in the region in a stable state.

Figure 10:
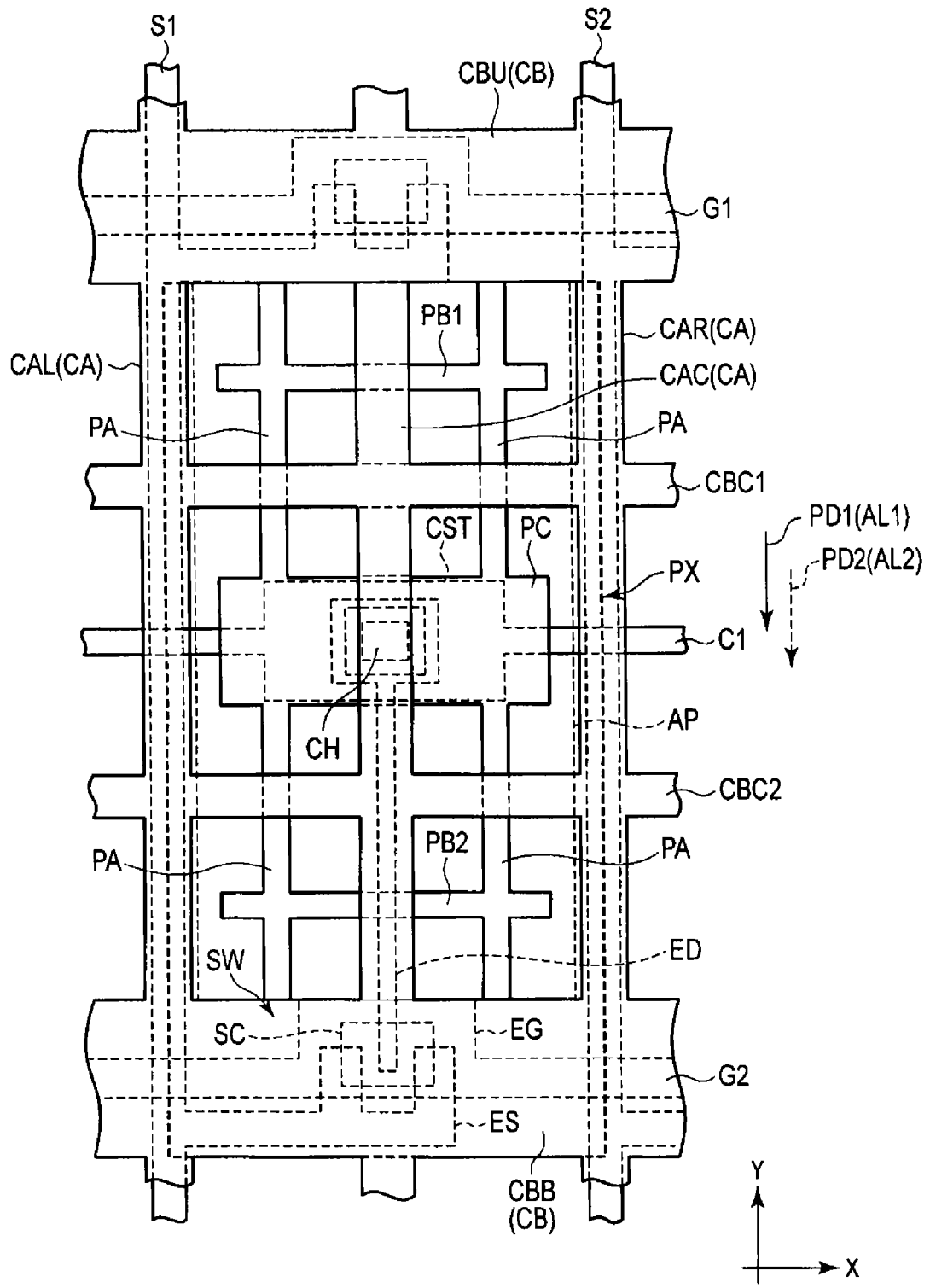
FIG. 10 is a plan view schematically showing a structure of one pixel when the display panel shown in FIG. 1 is seen from the counter substrate side according to an eighth embodiment.

Next the liquid crystal display device according to an eighth embodiment is explained with respect to the drawings. FIG. 10 is a plan view schematically showing the structure of one pixel when the liquid crystal display panel is seen from the counter substrate side. In this embodiment, the pixel electrode PE of the pixel PX is equipped with the sub-pixel electrode PB. In addition, in this embodiment, the width of the pixel PX in the first direction X is approximately 75 μm, and the width of the pixel PX in the second direction Y is approximately 230 μm.

In this embodiment, the contact portion PC is arranged in the center of the pixel. The pixel electrode PE further includes two sub-pixel electrodes PB1 and PB2. The common electrode CE includes two sub-common electrodes CBC1 and CBC2. Two main pixel electrodes PA extend to the upper end portion from the contact portion PC. Similarly, two main pixel electrodes PA extend to the lower end portion from the contact portion PC. The contact portion PC is formed in the rectangular shape, and includes two ends facing the source lines S1 and S2. The main pixel electrodes PA extend from four locations of the contact portion PC, apart from the ends to a center side thereof, to the upper end portion and the lower end portion, respectively. The contact portion PC and the sub-pixel electrodes PB1 and PB2 project from the ends of the main pixel electrodes PA to the source line S1 and S2 side.

The sub-common electrode CBU, the sub-pixel electrode PB1, the sub-common electrode CBC1, the contact portion PC, the sub-common electrode CBC2, the sub-pixel electrode PB2 and the sub-common electrode CBB are arranged in the second direction X from the upper end portion of the pixel PX in this order. The distances between the sub-common electrode CBU and the sub-pixel electrode PB1, between the sub-pixel electrode PB1 and the sub-common electrode CBC1, between the sub-common electrode CBC1 and the contact portion PC, between the contact portion PC and the sub-common electrode CBC2, the sub-common electrode CBC2 and the sub-pixel electrode PB2, and between the sub-pixel electrode PB2 and the sub-common electrode CBB are substantially equal.

According to this embodiment, the same effect as the sixth embodiment is achieved.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall with the scope and spirit of the inventions.

What is claimed is:

1. A liquid crystal display device, comprising:
    a first substrate provided with a pixel electrode including a contact portion, a pair of main pixel electrodes extending in a first direction from the contact portion, and a sub-pixel electrode arranged between the contact portion and an end of the extending main pixel electrode, the sub-pixel electrode extending in a second direction orthogonally crossing the first direction so as to connect the pair of main pixel electrodes;
    a second substrate provided with a common electrode including first and second main common electrodes sandwiching the pair of main pixel electrodes, a third main common electrode arranged substantially in the center between the pair of main pixel electrodes and extending in parallel with the first and second main common electrodes, and a first sub-common electrode arranged between the contact portion and the sub-pixel electrode, the first sub-common electrode connected with the first, second and third main common electrodes and extending in the second direction; and
    a liquid crystal layer held between the first substrate and the second substrate and having liquid crystal molecules.

2. The liquid crystal display device according to claim 1, wherein the contact portion, the first sub-common electrode and the sub-pixel electrode are arranged in this order in the first direction, and the distance between the contact portion and the first sub-common electrode is substantially equal to that between the first sub-common electrode and the sub-pixel electrode.

3. The liquid crystal display device according to claim 1, wherein the first substrate further includes a pair of source lines extending in the first direction, and the first and the second main common electrodes are arranged facing the source lines, respectively.

4. The liquid crystal display device according to claim 1, wherein the first substrate further includes a pair of gate lines extending in the second direction, and a second sub-common electrode and a third sub-common electrode are arranged facing the gate lines, respectively.

5. The liquid crystal display device according to claim 1, wherein an initial alignment direction of the liquid crystal molecule is substantially in parallel with the extending direction of the pair of main pixel electrodes when an electric field is not impressed between the pixel electrode and the common electrode.

6. The liquid crystal display device according to claim 4, wherein the contact portion is arranged close to one of the gate lines.

7. A liquid crystal display device, comprising:
a first substrate including;
  a pair of source lines extending in a first direction,
  first and second gate lines extending in a second direction orthogonally crossing the first direction, and
  a pixel electrode including a contact portion arranged close to the first gate line, first and second main pixel electrodes extending from the contact portion to the second gate line in the first direction, and first and second sub-pixel electrodes extending in the second direction arranged between the contact portion and the second gate line so as to connect the first and second main pixel electrodes,
a second substrate including;
  a main common electrode having first and second main common electrodes sandwiching the first and second main pixel electrodes and facing the source lines, respectively, and a third main common electrode arranged in the center between the first and second main pixel electrodes extending substantially in parallel with the first and second main pixel electrodes,
  a first sub-common electrode arranged between the contact portion and the first sub-pixel electrode, and
  a second sub-common electrode arranged between the first sub-pixel electrode and the second sub-pixel electrode, the first and second sub-common electrodes being connected with the first, second and third main common electrodes and extending in the second direction; and
a liquid crystal layer held between the first substrate and the second substrate and having liquid crystal molecules.

8. The liquid crystal display device according to claim 7, wherein the first substrate further includes a third sub-common electrode and a fourth sub-common electrode arranged facing the gate lines, respectively.

9. The liquid crystal display device according to claim 7, wherein an initial alignment direction of the liquid crystal molecule is substantially in parallel with the extending direction of the first and second main pixel electrodes.

10. The liquid crystal display device according to claim 7, wherein the contact portion, the first sub-common electrode, the first sub-pixel electrode, the second sub-common electrode, and the second sub-pixel electrode are arranged in this order between the first gate line and the second gate line.

11. The liquid crystal display device according to claim 10, wherein the distances between the contact portion and the first sub-common electrode, between the first sub-common electrode and the first sub-pixel electrode, between the first sub-pixel electrode and the second sub-common electrode, and between the second sub-common electrode and the second sub-pixel electrode are substantially the same.

12. A liquid crystal display device constituted by a plurality of pixels arranged in a matrix, comprising:
a first substrate including;
  a pair of source lines extending in a first direction,
  first and second gate lines extending in a second direction orthogonally crossing the first direction, and
  a pixel electrode including a contact portion arranged substantially in the center of the pixel, first and second main pixel electrodes extending from the contact portion to the first gate line, third and fourth main pixel electrodes extending from the contact portion to the second gate line, a first sub-pixel electrode arranged between the contact portion and the first gate line and extending in the second direction arranged so as to connect the first and the second main pixel electrodes, and a second sub-pixel electrode arranged between the contact portion and the second gate line and extending in the second direction so as to connect the third and the fourth main pixel electrodes,
a second substrate including;
  a main common electrode having first and second main common electrodes sandwiching the first, second, third and fourth main pixel electrodes and a third main common electrode arranged between the first main pixel electrode and the second main pixel electrode, and between the third main pixel electrode and the fourth main pixel electrode and extending substantially in the center of the pixel,
  a first sub-common electrode arranged between the contact portion and the first sub-pixel electrode, and
  a second sub-common electrode arranged between the second sub-pixel electrode and the contact portion, the first and second sub-common electrodes being connected with the first, second, and third main common electrodes and extending in the second direction; and
a liquid crystal layer held between the first substrate and the second substrate and having liquid crystal molecules.

13. The liquid crystal display device according to claim 12, wherein the second substrate further includes a third sub-common electrode and a fourth sub-common electrode arranged facing the gate lines, respectively.

14. The liquid crystal display device according to claim 12, wherein an initial alignment direction of the liquid crystal molecule is substantially in parallel with the extending direction of the first, second, third, and fourth main pixel electrodes.

15. The liquid crystal display device according to claim 12, wherein the first sub-pixel electrode, the first sub-common electrode, the contact portion, the second sub-common electrode, and the second sub-pixel electrode are arranged in this order between the first gate line and the second gate line.

16. The liquid crystal display device according to claim 15, wherein the distances between the first sub-pixel electrode and the first sub-common electrode, between the first sub-common electrode and the contact portion, between the contact portion and the second sub-common electrode, and between the second sub-common electrode and the second sub-pixel electrode are substantially the same.

* * * * *